US011921187B1

(12) United States Patent
Russell et al.

(10) Patent No.: US 11,921,187 B1
(45) Date of Patent: Mar. 5, 2024

(54) MONITORING NON-STATIONARY OBJECT DISTANCE USING ULTRASONIC SIGNALS

(71) Applicant: Amazon Technologies, Inc., Seattle, WA (US)

(72) Inventors: Spencer Russell, Quincy, MA (US); Krishna Kamath Koteshwara, Santa Clara, CA (US); Tarun Pruthi, Fremont, CA (US); Trausti Thor Kristjansson, San Jose, CA (US); Anran Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 497 days.

(21) Appl. No.: 17/232,649

(22) Filed: Apr. 16, 2021

(51) Int. Cl.
G01S 13/56 (2006.01)
G01S 7/40 (2006.01)
G01S 13/58 (2006.01)
G01S 13/84 (2006.01)

(52) U.S. Cl.
CPC ............ *G01S 13/56* (2013.01); *G01S 7/4056* (2013.01); *G01S 13/581* (2013.01); *G01S 13/584* (2013.01); *G01S 13/84* (2013.01)

(58) Field of Classification Search
CPC ...... G01S 13/56; G01S 7/4056; G01S 13/581; G01S 13/584; G01S 13/84
USPC .......... 342/195, 146, 455; 702/166; 600/443
See application file for complete search history.

(56) References Cited

U.S. PATENT DOCUMENTS

| 2010/0010350 A1* | 1/2010 | Baba ................... G01S 15/8993 600/443 |
| 2012/0265486 A1* | 10/2012 | Klofer .................... G01F 23/80 702/166 |
| 2015/0185316 A1* | 7/2015 | Rao ........................ G01S 13/931 342/146 |
| 2016/0061942 A1* | 3/2016 | Rao ........................ G01S 13/583 342/195 |

* cited by examiner

*Primary Examiner* — Bo Fan
(74) *Attorney, Agent, or Firm* — Lee & Hayes P.C.

(57) ABSTRACT

Techniques for monitoring devices to use ultrasonic signals to detect and track the locations of moving objects in an environment. To determine distance information, the monitoring devices emit a frequency-modulated continuous wave (FMCW) signal at an ultrasound frequency range. Reflections of the FMCW ultrasonic signal are used to generate time-of-arrival (TOA) profiles that indicate distances between the monitoring device and objects in the environment. The reflections can be processed to suppress undesirable interferences, such as reflections off non-mobile objects in the environment (e.g., walls, furniture, etc.), vibrations off the floorings or the ceilings, etc. After processing the reflections, a heatmap can be used to plot the intensity of the reflections for the different TOAs of the reflections, and depict the movement of the user over time. Finally, a Kalman filter is used to smooth the peaks in the intensity values on the plot, and determine the trajectory of the human.

20 Claims, 9 Drawing Sheets

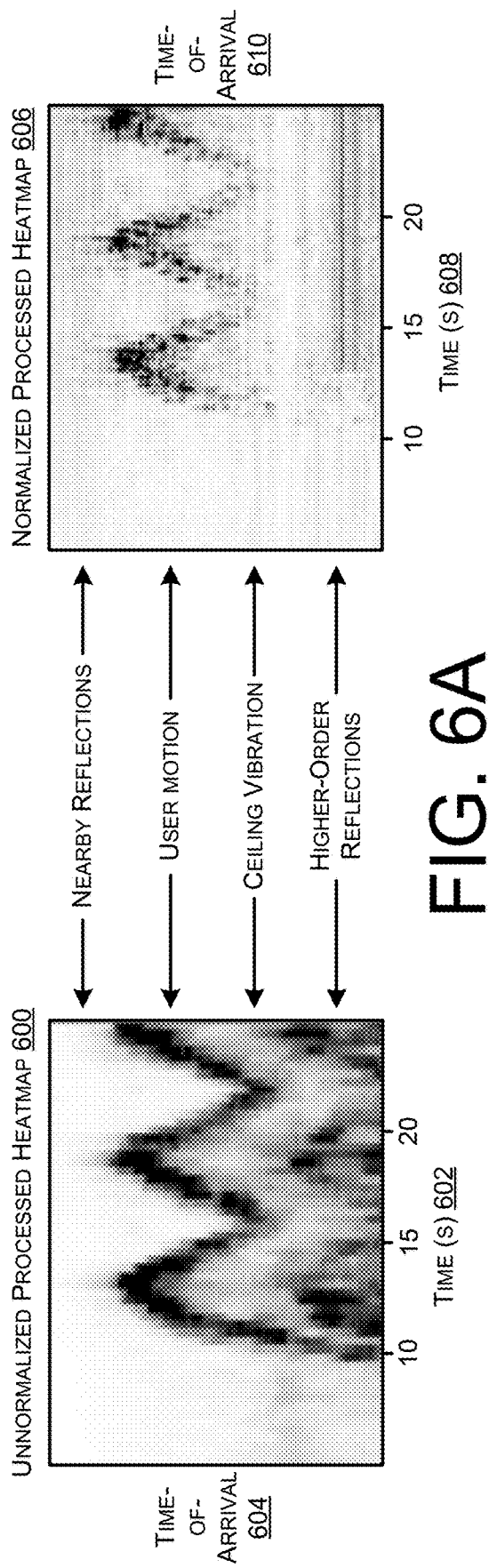
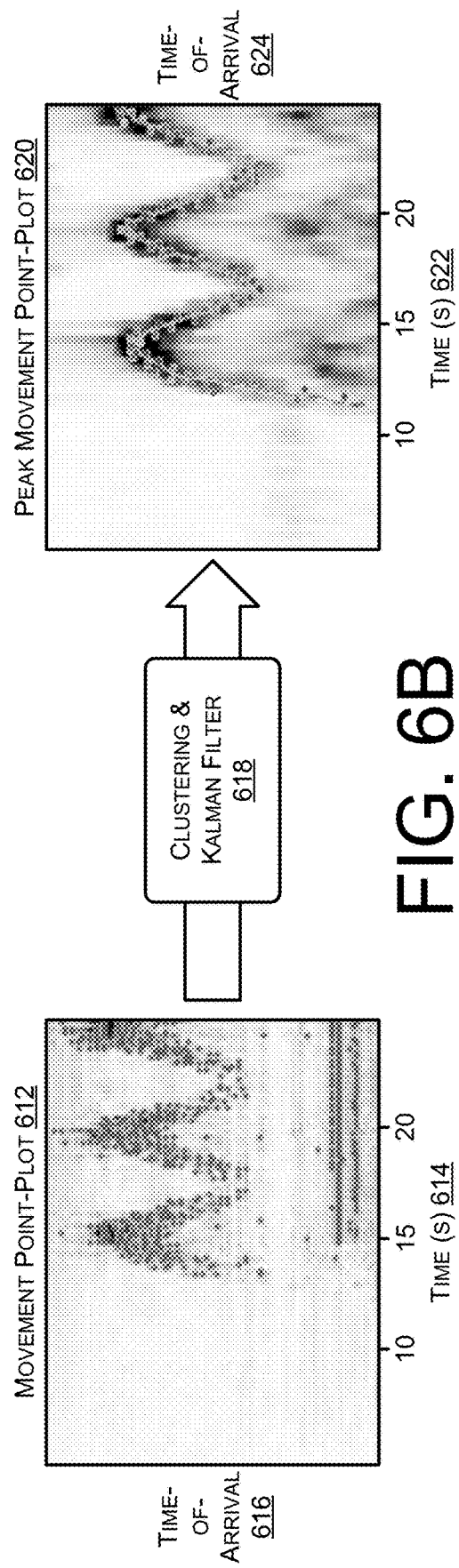
FIG. 6A
FIG. 6B

700 ⤴

(7A)

↓

IDENTIFY, FROM THE POINTS AND IN A FIRST TIME FRAME, A FIRST POINT THAT CORRESPONDS TO A FIRST REFLECTION OF A FIRST PORTION OF A FIRST FMCW ULTRASONIC SIGNAL, THE FIRST POINT BEING ASSOCIATED WITH A FIRST DISTANCE
710

↓

IDENTIFY, FROM THE POINTS AND IN A SECOND TIME FRAME ADJACENT THE FIRST TIME FRAME, A SECOND POINT THAT CORRESPONDS TO A SECOND REFLECTION OF A SECOND PORTION OF THE FIRST FMCW ULTRASONIC SIGNAL, THE SECOND POINT BEING ASSOCIATED WITH A SECOND DISTANCE
712

↓

CALCULATE AN AVERAGE DISTANCE USING THE FIRST DISTANCE AND THE SECOND DISTANCE
714

↓

DETERMINE, BASED AT LEAST IN PART ON THE AVERAGE DISTANCE, DISTANCE DATA INDICATING A DISTANCE BETWEEN THE OBJECT AND THE MONITORING DEVICE
716

MONITORING NON-STATIONARY OBJECT DISTANCE USING ULTRASONIC SIGNALS

BACKGROUND

Many devices and technologies exist for determining the locations of users in different environments, and for different purposes. For instance, devices with cameras can use vision-based localization techniques to determine the presence and locations of users in environments. Additionally, devices with loudspeakers and microphones can emit and analyze sounds using sound-source localization (SSL) techniques to determine the angular position of users relative to the devices. Devices that are capable of determining locations of users can be used for various purposes, such as for security purposes including intrusion detection, location-based automation purposes including controlling devices and appliances around users, etc. However, many devices do not include extra hardware, such as cameras, to determine the locations of users. Although devices with microphones and loudspeakers can use techniques to determine angular information of users relative to the devices, it can be difficult to determine distances between the users and the devices using SSL. For instance, if the devices are placed near objects in the environments, such as walls or furniture, the sounds emitted from the user get reflected by these objects and result in the devices being unable to accurately determine the distances between the devices and the users. Accordingly, many devices are unable to accurately determine distances to users, and are thus unable to perform useful operations such as intrusion detection, location-based automation, and so forth.

BRIEF DESCRIPTION OF THE DRAWINGS

The detailed description is set forth below with reference to the accompanying FIGURES. In the FIGURES, the left-most digit(s) of a reference number identifies the FIGURE in which the reference number first appears. The use of the same reference numbers in different FIGURES indicates similar or identical items. The systems depicted in the accompanying FIGURES are not to scale and components within the FIGURES may be depicted not to scale with each other.

FIG. 6A illustrates examples of an unnormalized processed heatmap and a normalized processed heatmap that indicate a movement path of a user in an environment.

FIG. 6B illustrates an example movement point-plot including points that correspond to a movement path of a user, and an example peak movement point-plot that indicates points in the movement point-plot that correspond to intensity levels that are above a threshold intensity level.

FIGS. 7A and 7B collectively illustrate a flow diagram of an example process for a monitoring device to emit ultrasonic signals for performing distance detection indicating a location of a user that is moving in an environment over a period of time.

DETAILED DESCRIPTION

Figure 1:
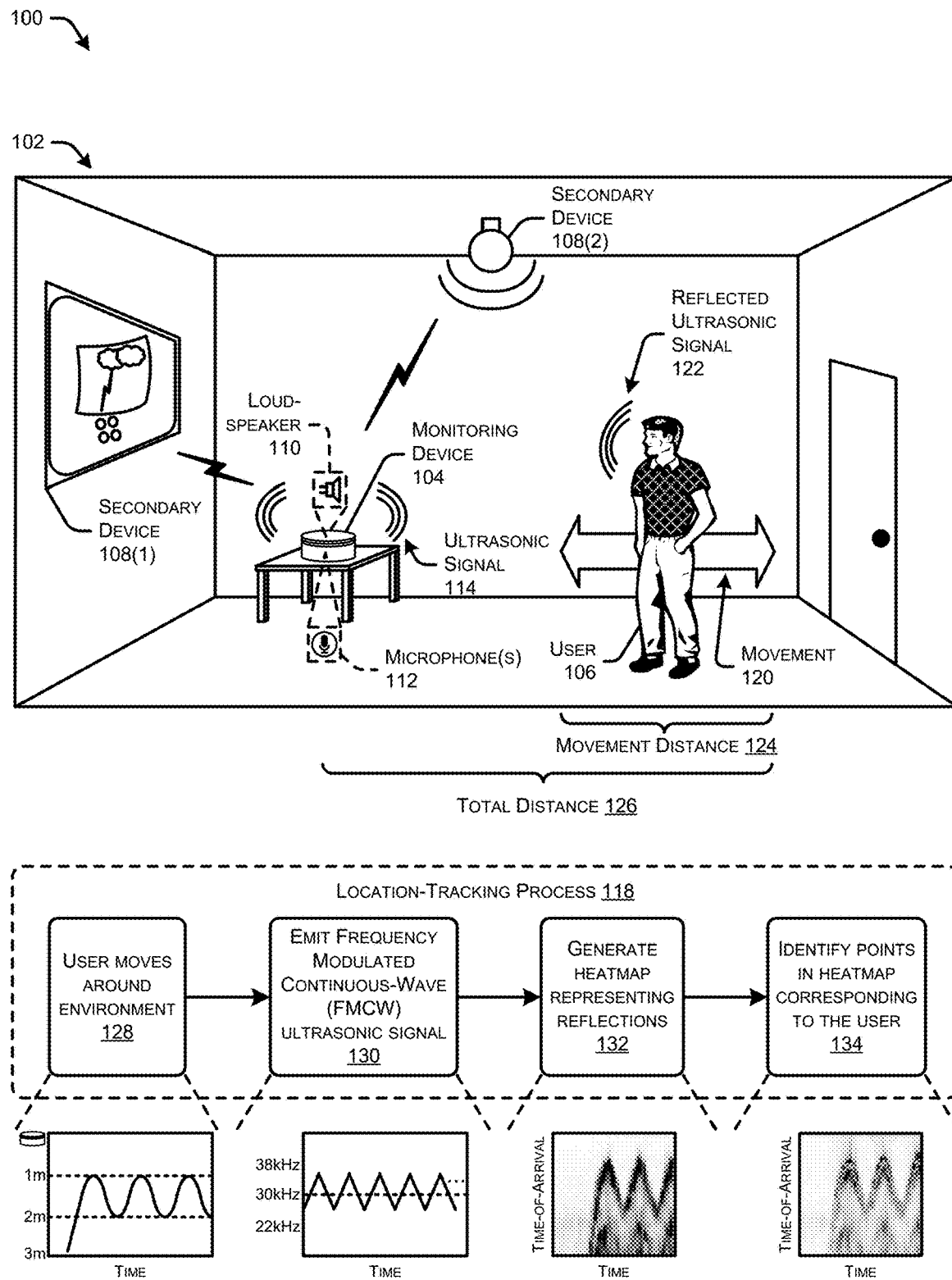
FIG. 1 shows an illustrative monitoring device in a user environment that is performing distance detection for a mobile user. The architecture includes the monitoring device controlling secondary devices physically situated in the user environment based on monitoring the distance of the mobile user from devices. In this example, the monitoring device has a loudspeaker and a microphone that are used to monitor the distance of the user from objects in the environment.

This disclosure describes techniques for monitoring devices to use ultrasonic signals to detect and track the locations of moving objects in an environment. Monitoring devices can use ultrasonic signals to perform presence detection by detecting movement of an object, such as a person. For instance, monitoring devices can emit ultrasonic signals into the environment, and characterize the change in the frequency, or the Doppler shift, of the reflections of the ultrasonic signals off the person caused by the movement of the person relative to the monitoring devices. However, it is desirable for monitoring devices to localize and track the distance of a moving human for various purposes, such as location-based automation and home security. To determine distance information, the monitoring devices may emit a frequency-modulated continuous wave (FMCW) signal at an ultrasound frequency range. Reflections of the FMCW ultrasonic signal are then used to generate time-of-arrival profiles that indicate distances between the monitoring device and objects in the environment. The reflections can be processed to suppress undesirable interferences, such as reflections off non-mobile objects in the environment (e.g., walls, furniture, etc.), vibrations off the floorings or the ceilings, shadowing due to occlusion caused by the moving person, and so forth. After processing the reflections, a heatmap can be used to plot the intensity of the processed reflections for the different time-of-arrivals of the reflections, and depict the movement of the user over time. Finally, a Kalman filter is used to smooth the peaks in the intensity values on the plot, and determine the trajectory of the human. In this way, FMCW ultrasonic signals can be used to determine a distance trajectory of a user over time. Using these techniques, devices with only a microphone and loudspeaker can determine distances to users for various purposes.

To perform the techniques described herein, a monitoring device may periodically, continuously, and/or intermittently emit FMCW ultrasonic signals using a loudspeaker. An FMCW signal is a signal with a frequency that increases or decreases, or is linearly modulated, over time to create a frequency sweep. An FMCW signal can include an increasing frequency sweep (or an upchirp), a decreasing frequency sweep (or a downchirp), or a combination thereof to create a triangular sweep signal. The FMCW signals described herein may be emitted in an ultrasonic frequency range, or in a range above approximately 20 kilo-hertz (kHz).

The monitoring device can then capture reflections of the FMCW signals, and process the received signals to determine distance information for a moving person over time. An FMCW signal has a unique property where, when it comes to obtaining the time-of-arrival (TOA) profile, the received signal can be demodulated to a signal with frequency components that correspond to the amplitude (or intensity) of the reflection signals at different TOAs. To demodulate the FMCW signal, the monitoring device may multiply the transmitted signal with the received signal in the time domain, and the resulting signal contains frequency components whose frequency is linearly proportional to the TOA of each reflection.

After demodulating the received signal, the monitoring device may determine the intensity-feature data for the demodulated signal by converting the demodulated signal from the time domain into the frequency domain using a transform (e.g., Fourier transform, Laplace transform, Z transform, etc.). After converting to the frequency domain, the monitoring device may determine the TOA profile for the signal and the intensity features (e.g., amount of energy for the TOA profile over time) for the TOA profile. That is, the representation of the demodulated signal in the frequency-domain may represent the intensity of the reflections at different distances.

In order to identify user movement from the signal, the monitoring device may subtract constant reflections from the signal. For instance, the monitoring device may have previously generated reflections signals corresponding to the environment when no movement was detected, or "constant" reflections. The monitoring device may use these constant reflections to subtract, or remove, the representations of the static reflectors from the signal. That is, the constant reflection signals represent energy values, or intensity values, of the reflections off of contact/static objects in the environment, such as ceilings, floors, walls, furniture, and other unwanted interferers. The monitoring device may use the previously-generated constant-reflection signals to remove the representation of these unwanted objects from the signal by subtracting or removing those representations (e.g., similar to echo cancellation and/or direct path suppression). After removing the representation of the constant objects from the signal, the signal may more strongly represent the user as the user moves through the environment.

The monitoring device may then generate a plot, such as a heatmap, that represents the intensity at every time-of-arrival over the period of time that the signal was received. Although the constant-reflections signal was used to at least partially remove or attenuate the representations of the constant objects in the environment, the heatmap may still include intensities that represent unwanted types of reflections. For instance, the heatmap may include representations of direct-path signals (e.g., signals that reflect internal to the monitoring device), nearby reflections (e.g., reflections off a surface on which the monitoring device is sitting), vibrations caused by the ceiling or floor, occlusion representations due to the user moving through and occluding portions of the environment, higher-order reflections where, at further distances, traces similar to the actual human motion are found (albeit much weaker) and/or other unwanted reflections or signals.

To help remove unwanted signals, and further isolate the reflections off the user, the monitoring device may process the signal further using various processing techniques. For instance, the monitoring device may apply a time-varied gain to the signal. Generally, the attenuation in the amplitude of the reflected signals is inversely proportional to the distance over which the reflections travel. Accordingly, the signal may be processed using time-varied gain techniques to account for the spreading loss and air attenuation (e.g., add gain to signals received with later time-of-arrivals, or at greater distances). Further, the monitoring device may apply a median filter where the median filter is used to reduce the intensity of the vibrations. For instance, the median filter may have a width of around 10 samples, but vibrations may only affect 2-3 samples, and the median filter may reduce the intensity of these vibrations without affecting the user movement traces.

Further, the monitoring device may normalize the signal using the feature data from the constant-reflection signal. For example, the monitoring device may determine a standard deviation for the raw features of the constant-reflection signal, and divide the features of the signal by the standard deviation in order to reduce the spontaneous vibrations. After normalizing the features of the signal, large intensity values in the heatmap representing the normalized intensity features may generally correspond to the movement trajectory of the user. The monitoring device can then identify the points in the heatmap that have intensity values above a threshold value, and are thus likely to correspond to reflections off of the user moving through the environment.

The monitoring device may then analyze the plot using a clustering algorithm (e.g., mean shift algorithm, k-means algorithm, etc.) to cluster the points and identify the center of each cluster. After using the clustering algorithm, the monitoring device identifies the maximum points in each cluster (e.g. cluster with the highest intensity value), and/or the points in the cluster with intensity values over a threshold intensity value. In this way, the monitoring device is able to determine the points in each time frame that are above a threshold intensity value, and/or are maximum intensity values for their receptive clusters.

The monitoring device may then employ a Kalman filter to identify the points in each time frame that correspond to reflections off the user as the user moves through the environment. The Kalman filter can track movement over time by maintaining, or fixing, the state of the user's trajectory overtime. The time series of intensity points can be modeled as a prediction-observation combination where the distance at each time frame can be predicted using the distance at the previous time frame(s). The Kalman filter can be used to maintain a state, or an incoming biased observation, to be used to predict and output a result. The use of the Kalman filter can help remove outliers, such as outliers caused by higher-order reflections or noise, in order to identify the points that best fit the trajectory of the human in the environment. The Kalman filter is used to remove outliers, and also identify best candidates from among multiple candidates in a time frame, and output points for each time frame that are most likely to correspond to a trajectory of the user in the environment and the distances at which the user was from the monitoring device.

The monitoring devices described herein may be installed or placed in an environment to monitor a location, such as a room of a house. For instance, a monitoring device may be a light switch that is installed in a room, a voice-interface device moved into a room to interact with a user through voice, a security-system device to monitor a location, etc. The monitoring devices may emit ultrasonic signals into the room to determine if a user is present in the room, and a location at which the user is in the room. The monitoring devices may use a loudspeaker to pulse an ultrasonic signal at the determined frequency, and analyze audio data generate by one or more microphones to detect motion of a person, and distance information for the person.

Generally, the techniques described herein may be implemented when users of the monitoring devices have opted in for use of the location-detection services. For instance, users may interact with the monitoring device, a user account associated with the monitoring device, and/or otherwise indicate that they would like to use the location-detection services described herein.

While the techniques described herein may be applied and useful in many scenarios, the monitoring devices may perform various operations upon detecting movement of a person, detecting a direction of the movement of the person, and/or detecting the number of people in the room. For instance, the monitoring devices may cause various secondary devices to turn on or off (e.g., lights, television, security alarm, etc.), optimize the output of music data to create auditory "sweet spots" for the person as they move through the room, perform more effective beamforming techniques based on the location and/or movement of the user, and so forth.

Certain implementations and embodiments of the disclosure will now be described more fully below with reference to the accompanying FIGURES, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 shows an illustrative architecture 100 including a user environment 102 in which a monitoring device 104 is performing distance detection using ultrasonic signals. The architecture 100 includes at least one monitoring device 104 controlling secondary devices 108 (e.g., television 108(1), light 108(2), or any other controllable device) physically situated in the user environment 102 based on detecting the presence and/or distance of a user 106. In this example, the monitoring device 104 includes or has a loudspeaker 110 and one or more microphones 112 to determine distance information for the user 106. The monitoring device 104 may comprise any type of device, such as a fixed computing device (e.g., light switch, appliance, etc.), and/or a portable or mobile device such as voice-controlled devices, smartphones, tablet computers, media players, personal computers, wearable devices, various types of accessories, and so forth.

As shown in FIG. 1, the loudspeaker 110 of the monitoring device 104 may transmit, or otherwise output, an ultrasonic signal 114. Generally, the loudspeaker 110 may comprise any type of electroacoustic transducer that convers an electric audio signal into a corresponding sound. In some instances, the loudspeaker 110 may be an existing on-board speaker configured to output sound within frequency ranges that are audible to humans, such as 35 Hz-20 kHz. However, in the illustrated example the ultrasonic signal 114 may include at least a pulsed, or a continuous, emission of the signal 114 at a frequency that is outside the frequency range in which humans can hear sound (e.g., over 20 kHz). Thus, the loudspeaker may be emitting an ultrasonic signal 114 that is out-of-band for the loudspeaker 110. As illustrated, FIG. 1 may represent a high-level the location-tracking process 118 performed by the monitoring device 104 in order to track the distance of the user 106 as the user moves 120 in the environment 102.

At 128, the user 106 may be moving around the environment 102 for a period of time. For instance, the user 106 may be moving around a room. At 130, the monitoring device 104 may emit an FMCW ultrasonic signal 114 into the environment 102. The monitoring device 104 may emit continuously, or periodically, emit the FMCW ultrasonic signals 114 into the environment. The monitoring device 104 may wait for a period of time between the FMCW ultrasonic signal 114 emissions (e.g., 100 milliseconds) to allow the reverberations or reflections to return to the monitoring device 104.

As shown, the user 106 may be moving back and forth from the monitoring device 104 ranging anywhere from 1 meter to 2 meters away from the monitoring device 104. The monitoring device 104 may emit FMCW ultrasonic signals using the loudspeaker 110 where the FMCW ultrasonic signals 114 have frequencies that increase or decrease, or are linearly modulated, over time to create a frequency sweep. The FMCW ultrasonic signals 114 can include an increasing frequency sweep (or an upchirp), a decreasing frequency sweep (or a downchirp), or a combination thereof to create a triangular sweep signal. The FMCW ultrasonic signals 114 described herein may be emitted in an ultrasonic frequency range, or in a range above approximately 20 kilo-hertz (kHz). As shown, the FMCW ultrasonic signals 114 may have an upchirp followed by a downchirp.

At 132, the monitoring device 104 may generate a heatmap representing reflections of the FMCW ultrasonic signals 114 off objects in the environment 102. For instance, the monitoring device 104 may generate a plot, such as the illustrated heatmap, that represents the intensity at every time-of-arrival over the period of time that the signal was received.

At 134, the monitoring device 104 may identify points in the heatmap corresponding to movement 120 by the user 106. For instance, the monitoring device 104 may then analyze the plot in the heatmap using a clustering algorithm (e.g., means shift algorithm, k-means algorithm, etc.) to cluster the points and identify the center of each cluster. After using the clustering algorithm, the monitoring device 104 identifies the maximum points in each cluster (e.g. cluster with the highest intensity value), and/or the points in the cluster with intensity values over a threshold intensity value. The monitoring device 104 may then employ a Kalman filter to identify the points in each time frame that correspond to reflections off the user as the user 106 moves through the environment 102.

Figure 2:
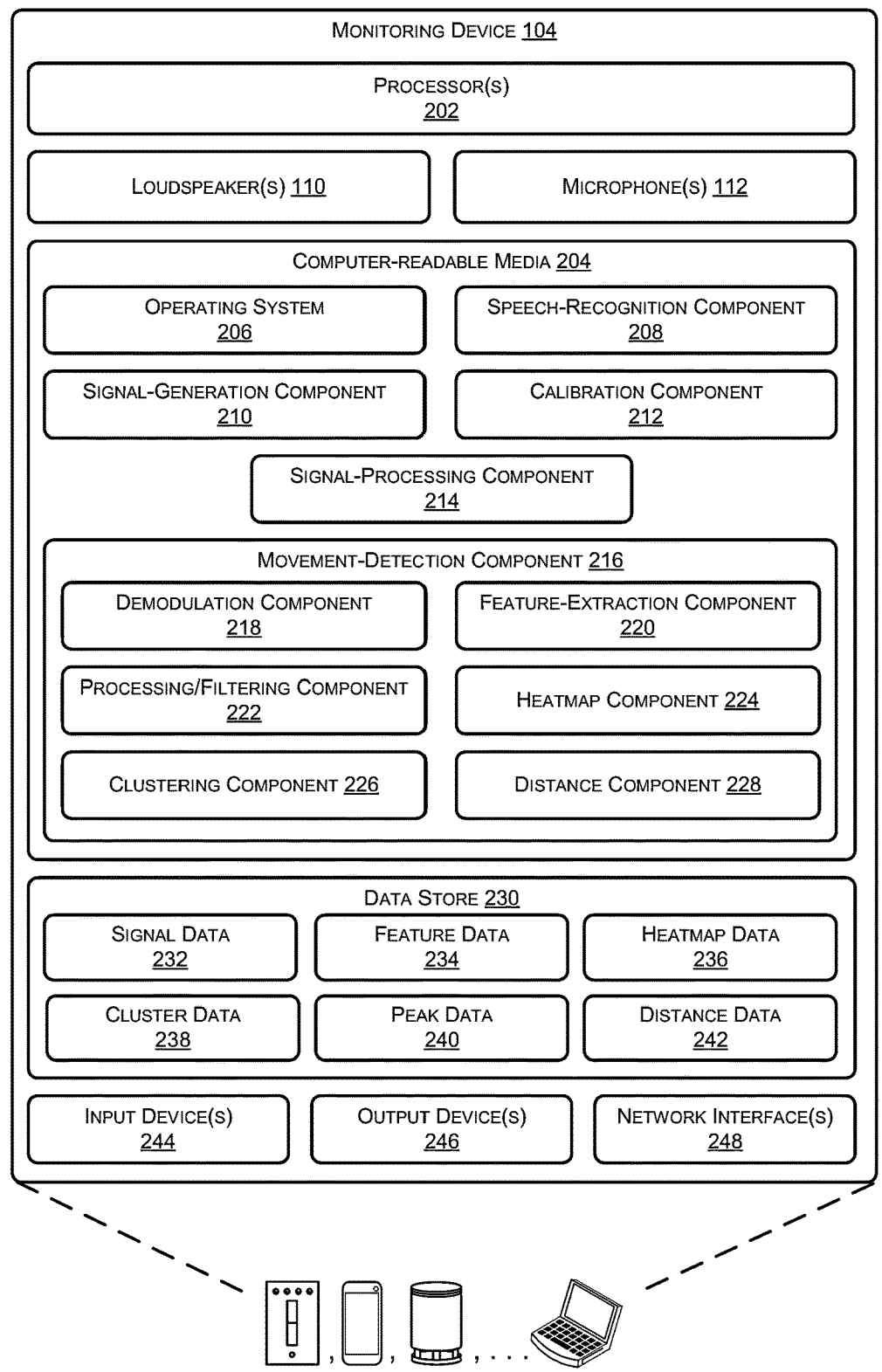
FIG. 2 illustrates an example configuration of components of a monitoring device that performs distance detection for a mobile user.

FIG. 2 illustrates an example configuration of components of a monitoring device 104 that performs distance detection for a mobile user 106. Generally, the monitoring device 104 may comprise any type of device, such as a fixed computing device (e.g., light switch, appliance, etc.), and/or a portable or mobile device such as voice-controlled devices, smartphones, tablet computers, media players, personal computers, wearable devices, various types of accessories, and so forth.

The monitoring device 104 may include one or more processors 202 configured to execute various computer-executable instructions stored on the monitoring device 104. Further, the monitoring device 104 may include one or more loudspeakers 110 positioned at one or more locations on the monitoring device 104. The loudspeakers 110 may include one loudspeaker 110, and/or an array of loudspeakers configured to coordinate the output of sound. The loudspeakers 110 may comprise any type of electroacoustic transducer which converts an electronic audio signal (e.g., audio data) into corresponding sound represented by the audio signal. In some examples, the loudspeaker(s) 110 may be simple onboard speakers designed to output sound in frequency ranges that are audible to humans, rather than being specialized ultrasonic transducers. However, in other examples the loudspeaker(s) 110 may be specialized ultrasonic transducers depending on the monitoring device 104.

The monitoring device 104 may further include the one or more microphones 112, which may be a microphone array 112 that comprises multiple microphones 112 which may include transducers that convert sound into an electrical audio signal. The microphone(s) 112 may include any number of microphones that are arranged in any pattern. For example, the microphone(s) 112 may be arranged in a geometric pattern, such as a linear geometric form, circular geometric form, or any other configuration. As an example, an array of four microphones may be placed in a circular pattern at 90-degree increments (e.g., 0, 90, 180, 270) to receive sound from four directions. The microphone(s) 112 may be in a planar configuration, or positioned apart in a non-planar three-dimensional region. In some implementations, the microphone(s) 112 may include a spatially disparate array of sensors in data communication. For example, a networked array of sensors may be included. The microphone(s) 112 may include omni-directional microphones, directional microphones (e.g., shotgun microphones), and so on.

The monitoring device 104 may further include computer-readable media 204 that may be used to store any number of software and/or hardware components that are executable by the processor(s) 202. Software components stored in the computer-readable media 204 may include an operating system 206 that is configured to manage hardware and services within and coupled to the monitoring device 104. The computer-readable media 204 may store a speech-recognition component 208 that, when executed by the processor(s) 202, perform speech-recognition on processed audio signal(s) to identify one or more voice commands represented therein. For instance, the speech-recognition component 208 may convert the audio signals into text data using automatic-speech recognition (ASR), and determine an intent for voice commands of the user 106 using natural-language understanding (NLU) on the text data. Thereafter, a command processor, stored in the computer-readable media 204 (and/or at a remote network-based system), may cause performance of one or more action in response to identifying an intent of the voice command. In the illustrated example, for instance, the command processor may issue an instruction to control a secondary device 108. For instance, the command processor may issue one or more instructions to the television 108(1) to show the weather channel, sends an instruction to dim the light 108(2), and/or output music using a loudspeaker 110.

The computer-readable media 204 may further store a signal-generation component 210 that, when executed by the processor(s) 202 generate audio signals/data that represent sound to be output by the loudspeaker(s) 110. The signal-generation component 210 may, for example, generate audio data representing ultrasonic signals that are output by the loudspeaker(s) 110 at a frequency that is above the audible range of humans. The signal-generation component 210 may generate ultrasonic signals at various power levels depending on, for example, a size of a room that the monitoring device 104 is in. Further, the signal-generation component 210 may generate ultrasonic signals that are converted into sound by the loudspeaker(s) 110 according to various timing implementations, such as a continuously emitted signal, a pulsed sound, a periodically pulsed sound, etc. In some examples, the signal-generation component 210 may be configured to generate a calibration signal, such as an audio sweep signal, to determine audio characteristics of a room or other environment of the monitoring device 104. In some instances, the signal-generation component 210 may be configured to perform techniques for reducing the emission level of ultrasonic signals 114 as described herein. The signal-generation component 210 may be configured to generate the FMCW ultrasonic signals as described herein, and/or any other type of ultrasonic signals. The signal-generation component 210 may generate, and cause the loudspeaker 110 to emit, any type of ultrasonic signal, such as any frequency-modulated ultrasonic signal, amplitude modulated ultrasonic signal, linear ultrasonic signal, and at any interval and/or continuous emission.

The computer-readable media 204 may further store a calibration component 212 configured to, when executed by the processor(s) 202, determine audio characteristics of an environment of the monitoring device 104 and/or carrier frequencies at which to output sound by the loudspeaker(s) 110. In some examples, the calibration component 212 may cause the signal-generation component 210 to generate audio data representing a calibration tone, such as an ultrasonic sweep signal, to determine audio characteristics of the environment of the monitoring device 104. The calibration component 212 may perform device calibration to determine an optimal frequency range for ultrasonic signals to be emitted by the loudspeaker(s) 110 into the environment. In some examples, the calibration component 212 may cause the signal-generation component 210 to generate an ultrasonic sweep signal that, when converted into sound by the loudspeaker(s) 110, emits a sound over a period of time at a range of ultrasonic frequencies (e.g., 27 kHz-42 k Hz). The calibration component 212 may also activate at least one microphone in the microphone(s) 112 to generate audio data representing the ultrasonic sweep signal, and determine an optimal frequency range/bin for the environment. For instance, the calibration component 212 may analyze various frequency ranges included in the total frequency range of the ultrasonic sweep signal and determine signal-to-noise (SNR) values for one or more frequency ranges. The calibration component 212 may determine which sub-frequency range in the total frequency range of the ultrasonic sweep signal has the best SNR value.

In some examples, the calibration component 212 may cause utilize the ultrasonic sweep signal upon installation of the monitoring device 104, after detecting movement, or the end of movement, using a sensor of the monitoring device 104, and/or periodically in order to determine an optimal frequency at which to emit ultrasonic signals into an environment of the monitoring device 104.

In some examples, the calibration component 212 may perform more passive techniques for determining acoustic characteristics of an environment of the monitoring device 104. For instance, the calibration component 212 may, at least periodically, simply utilize at least one microphone in the microphone(s) 112 to generate audio data while the loudspeaker(s) 110 is not outputting sound. The calibration component 212 may analyze that audio data to determine background noise or sound in the environment of the monitoring device 104. In this way, the calibration component 212 may detect noise that may be caused by other objects in the environment (e.g., television, ceiling fan, vacuum cleaner, etc.) that may interfere with analyzing audio data representing ultrasonic signals. The calibration component 212 may determine a background noise profile or signature that may later be used to help identify portions of audio data that represent reflections of the ultrasonic signal, rather than background noise. The calibration component 212 may provide an indication of a frequency at which to emit ultrasonic signals to the signal-generation component 210 in order to generate audio data/signals that represent the ultrasonic signals when converted by the loudspeaker(s) 110. In this way, the loudspeaker(s) 110 may emit ultrasonic signals 114 that are at a more optimized frequency range based on audio characteristics of the environment 102.

The computer-readable media 204 may further include a signal-processing component 214 that, when executed by the processor(s) 202, perform various operations for processing audio data/signals generated by the microphone(s) 112. For example, the signal-processing component 214 may include components to perform low-pass filtering and/or high-pass filtering to ensure that speech and other sounds in the spectrum region of the ultrasonic signal does not affect baseband processing. For instance, the signal-processing component 214 may performing high-pass filtering for the audio data received in each audio channel for respective microphones 112 to remove sounds at lower frequencies that are outside or lower than of the frequency range of the ultrasonic signal and/or reflected signals that have shifted, such as speech (e.g., 100 Hz, 200 Hz, etc.) or other sounds in the environment 102. Further, the signal-processing component 214 may perform baseband carrier shifts (e.g., at 96 kHz) to shift or modulate the audio signal back to baseband frequency from the carrier frequency (e.g., 46 kHz, 21 kHz, etc.). Additionally, the signal-processing component 214 may perform low-pass filtering for each audio signal generated by each microphone in the array 112 after the baseband carrier shift to remove signals from the audio signals that are higher than a certain cutoff frequency that is higher than audio signals representing the ultrasonic signal (e.g., a cutoff frequency of than 30 kHz, 33 kHz, 35 kHz, and/or any other cutoff frequency higher than the ultrasonic signal frequency range).

In some examples, the signal-processing component 214 may perform integer down sampling, such as digital sampling, to remove certain samples from the audio signals. For example, the signal-processing component 214 may perform any form of digital down sampling or decimation to reduce the sampling rate of the audio signals, such as down sampling at a rate of 2 kHz (or another appropriate frequency). In this way, the signal-processing component 214 may produce an approximation or representation of the audio signals generated by the microphone(s) 112, but at a lower frequency rate. After down sampling the audio signals, the signal-processing component 214 may perform various signal processing, such as windowing, Fourier Transformations, and/or logarithmic transformations. For example, the signal-processing component 214 may perform various types of transforms to convert the audio signal from the time domain into the frequency domain, such as a Fourier transform, a fast Fourier transform, a Z transform, a Fourier series, a Hartley transform, and/or any other appropriate transform to represent or resolve audio signals into their magnitude (or amplitude) components and phase components in the frequency domain. Further, the signal-processing component 214 may utilize any type of windowing function on the audio data, such as the Hanning Window, the Hamming Window, Blackman window, etc. Additionally, the signal-processing component 214 may perform a logarithmic transform on the magnitude components to transform the magnitude components of the frequency of the reflected signal. For instance, due to the high-dynamic range of the magnitude components of the frequency of the reflected ultrasonic signal, and because the amount of reflection that occurs from movement of the user 106 is relatively small (may appear similar to noise), the logarithmic transform may transform the magnitude components into a larger range. After applying a logarithmic transform to the magnitude components, the change in magnitude caused by the reflection of the ultrasonic signal off of the moving object, or person, will be more easily identifiable.

In this way, the signal-processing component 214 may generate magnitude components and phase components that represent the frequency components (magnitude and phase) of the audio signals that represent reflected signals that correspond to the ultrasonic signal. Generally, the magnitude components and phase components may be complex numbers that represent the audio signals at each frequency. Thus, the magnitude components and phase components may represent frequency content for audio signals from each audio channel generated by the microphone(s) 112 after various digital processing has been performed on the audio signals by the signal-processing component 214. The magnitude components may be represented as logarithmic values (dB), and the phase components may be represented by radian and/or degree values. In this way, the signal-processing component 214 may generate magnitude components and phase components representing audio signals generated by two or more microphones in the microphone(s) 112 over a period of time (e.g., 8 seconds).

The computer-readable media 204 may further store a movement-detection component 222 configured to determine distance information for the user 106 by analyzing audio data 220 generated by the microphone(s) 112 that represent reflected ultrasonic signals 122. The movement-detection component 216 may include a demodulation component 218 to demodulate the receive reflections of the emitted FMCW ultrasonic signal. The demodulation component 218 may multiply the transmitted signal with the received signal in the time domain, and the resulting signal contains frequency components whose frequency is linearly proportional to the TOA of each reflection.

The movement-detection component 222 may also include a feature-extraction component 220 that, when executed by the processor(s) 202, cause the processor(s) to extract the magnitude feature data and phase feature data from the magnitude and phase components generated by the signal-processing component 214. The feature-extraction component 220 may perform various operations for normalizing and stacking features of the magnitude components and phase components for each audio channel from the microphone(s) 112. For example, the feature-extraction component 220 may receive the complex numbers (e.g., magnitude components and phase components) and remove the first order statistics. Further, the feature-extraction component 220 may perform feature stacking to stack the magnitude components across N time intervals to create magnitude feature data, and stack the phase components to create phase feature data.

In some examples, the feature-extraction component 220 may further perform normalization and remove background noise. For instance, the monitoring device 104 may, at least periodically, activate one or more microphones 112 in the array to generate audio signals representing background noise in an environment 102 of the monitoring device 104. The components of the monitoring device 104 may analyze the background audio signal(s) representing the background noise, and the feature-extraction component 220 may further create background audio data which represents the background noise. Thus, once the feature-extraction component 220 has generated the magnitude feature data and/or the phase feature data, the feature-extraction component 220 may utilize the background audio data to subtract, or otherwise remove, the representation of the background noise from the magnitude feature data and/or the phase feature data. In this way, the feature-extraction component 220 may cause the background noise, such as a ceiling fan, a television, a refrigerator, etc., to not be represented in or by the magnitude feature data and/or the phase feature data.

In some examples, the magnitude feature data and the phase feature data may generally represent binned frequency features over time, such as 1 dimensional binned frequency features over time that represent reflections of the ultrasonic signal. the feature data may represent the intensity of the reflections at different distances, or for different time-of-arrivals.

The movement-detection component 216 may include a processing/filtering component 222 that is configured to process or filter the demodulated, frequency-domain signals that correspond to reflections of the FMCW ultrasonic signal 114. The processing/filtering component 222 may subtract constant reflections from the signal. For instance, the monitoring device 104 may have previously generated reflections signals corresponding to the environment when no movement was detected, or "constant" reflections. The processing/filtering component 222 may use these constant reflections to subtract, or remove, the representations of the static reflectors from the signal. That is, the constant reflection signals represent energy values, or intensity values, of the reflections off of contact/static objects in the environment, such as ceilings, floors, walls, furniture, and other unwanted interferers. The processing/filtering component 222 may use the previously-generated constant-reflection signals to remove the representation of these unwanted objects from the signal by subtracting or removing those representations (e.g., similar to echo cancellation and/or direct path suppression). After removing the representation of the constant objects from the signal, the signal may more strongly represent the user 106 as the user 106 moves through the environment 102.

The movement-detection component 216 may include a heatmap component 224 that is configured to generate a heatmap that represents the intensity at every time-of-arrival over the period of time that the signal was received. Although the constant-reflections signal was used to at least partially remove or attenuate the representations of the constant objects in the environment, the heatmap may still include intensities that represent unwanted types of reflections. For instance, the heatmap may include representations of direct-path signals (e.g., signals that reflect internal to the monitoring device), nearby reflections (e.g., reflections off a surface on which the monitoring device is sitting), vibrations caused by the ceiling or floor, occlusion representations due to the user moving through and occluding portions of the environment, higher-order reflections where, at further distances, traces similar to the actual human motion are found (albeit much weaker) and/or other unwanted reflections or signals.

The processing/filtering component 222 may help remove unwanted signals, and further isolate the reflections off the user 106. For instance, the processing/filtering component 222 may process the signal further using various processing techniques. For instance, the processing/filtering component 222 may apply a time-varied gain to the signal. Generally, the attenuation in the amplitude of the reflected signals is inversely proportional to the distance over which the reflections travel. Accordingly, the signal may be processed using time-varied gain techniques to account for the spreading loss and air attenuation (e.g., add gain to signals received with later time-of-arrivals, or at greater distances). Further, the processing/filtering component 222 may apply a median filter where the median filter is used to reduce the intensity of the vibrations. For instance, the median filter may have a width of around 10 samples, but vibrations may only affect 2-3 samples, and the median filter may reduce the intensity of these vibrations without affecting the user movement traces.

Further, the processing/filtering component 222 may normalize the signal using the feature data from the constant-reflection signal. For example, the processing/filtering component 222 may determine a standard deviation for the raw features of the constant-reflection signal, and divide the features of the signal by the standard deviation in order to reduce the spontaneous vibrations. After normalizing the features of the signal, large intensity values in the heatmap representing the normalized intensity features may generally correspond to the movement trajectory of the user. The heatmap component 224 may then identify the points in the heatmap that have intensity values above a threshold value, and are thus likely to correspond to reflections off of the user moving through the environment.

The movement-detection component 216 may include a clustering component 226 that may analyze the plot using a clustering algorithm (e.g., means shift algorithm, k-means algorithm, etc.) to cluster the points and identify the center of each cluster. After using the clustering algorithm, the clustering component 226 identifies the maximum points in each cluster (e.g. cluster with the highest intensity value), and/or the points in the cluster with intensity values over a threshold intensity value. In this way, the clustering component 226 is able to determine the points in each time frame that are above a threshold intensity value, and/or are maximum intensity values for their receptive clusters.

The movement-detection component 216 may include a distance component 228 that is configured to employ a Kalman filter to identify the points in each time frame that correspond to reflections off the user as the user moves through the environment. The Kalman filter can track movement over time by maintaining, or fixing, the state of the user's trajectory over time. The time series of intensity points can be modeled as a prediction-observation combination where the distance at each time frame can be predicted using the distance at the previous time frame(s). The Kalman filter can be used to maintain a state, or an incoming biased observation, to be used to predict and output a result. The use of the Kalman filter can help remove outliers, such as outliers caused by higher-order reflections or noise, in order to identify the points that best fit the trajectory of the human in the environment. The Kalman filter is used to remove outliers, and also identify best candidates from among multiple candidates in a time frame, and output points for each time frame that are most likely to correspond to a trajectory of the user in the environment and the distances at which the user 106 was from the monitoring device 104.

The monitoring device 104 may further include a data store 230, which may comprise any type of storage (e.g., Random Operating Memory (ROM), disk storage, drive storage, Random-Access Memory (RAM), and/or any other type of storage). The data store 230 may store signal data that may be used to generate FMCW ultrasonic signals that are emitted by the loudspeaker 110, and/or received signal data representing reflections and other signals in the environment 102 and generated using the microphone(s) 112.

The data store 230 may store feature data 234, which may be frequency characteristics of the received signals and/or transmitted signals (e.g., intensity values, amplitude/magnitude data, phase data, etc.). the data store may store heatmap data 236 that represents heatmaps of intensity values for TOA profiles collected overtime, as well as cluster data 238 that indicates clusters of points across different time frames for a received signal. the cluster data 238 may indicate clusters of points in the heatmap data 26, where each point corresponds to an intensity value for a received signal. The data store 230 may store peak data 240, which may indicate peaks within each cluster, within each frame, and/or thresholds associated with peaks in the intensity values. The data store 230 may further store distance data 242 that indicates distances, over time, that a user 106 is from the monitoring device 104. The distance data 232 may be determined based on time-of-arrivals for points in the heatmaps 236 that correspond to intensity values determined to represent reflections off the user 106.

The computer-readable media 204 may further store an audio-player component configured to, when executed by the processor(s) 202, cause the processor(s) 202 to play audio such as music songs or other audio files. The audio-player component may cause audio data to be provided to the loudspeaker(s) 110 to be converted into sound. In some examples, prior to providing the audio data to the loudspeaker(s) 110, the audio data may be stored in the audio-data buffer. In such examples, a mixer component may analyze the audio data stored in the audio-data buffer and determine how to mix the audio data, such as music data, with audio data representing the ultrasonic signal such that the output sound does not experience saturation.

The monitoring device 104 may comprise any type of portable and/or fixed device and include one or more input devices 244 and output devices 246. The input devices 244 may include a keyboard, keypad, lights, mouse, touch screen, joystick, control buttons, etc. The output devices 246 may include a display, a light element (e.g., LED), a vibrator to create haptic sensations, or the like. In some implementations, one or more loudspeakers 110 may function as output devices 246 to output audio sounds.

The monitoring device 104 may have one or more network interfaces 248 such as a wireless or Wi-Fi network communications interface, an Ethernet communications interface, a cellular network communications interface, a Bluetooth communications interface, etc., for communications over various types of networks, including wide-area network, local-area networks, private networks, public networks etc. In the case of a wireless communications interfaces, such interfaces may include radio transceivers and associated control circuits and logic for implementing appropriate communication protocols. The network interface(s) 248 may enable communications between the monitoring device 104 and the secondary devices 108, as well as other networked devices. Such network interface(s) can include one or more network interface controllers (NICs) or other types of transceiver devices to send and receive communications over a network.

For instance, the network interface(s) 248 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 248 may include a wide area network (WAN) component to enable communication over a wide area network. The networks may represent an array of wired networks, wireless networks, such as WiFi, or combinations thereof.

Figure 3:
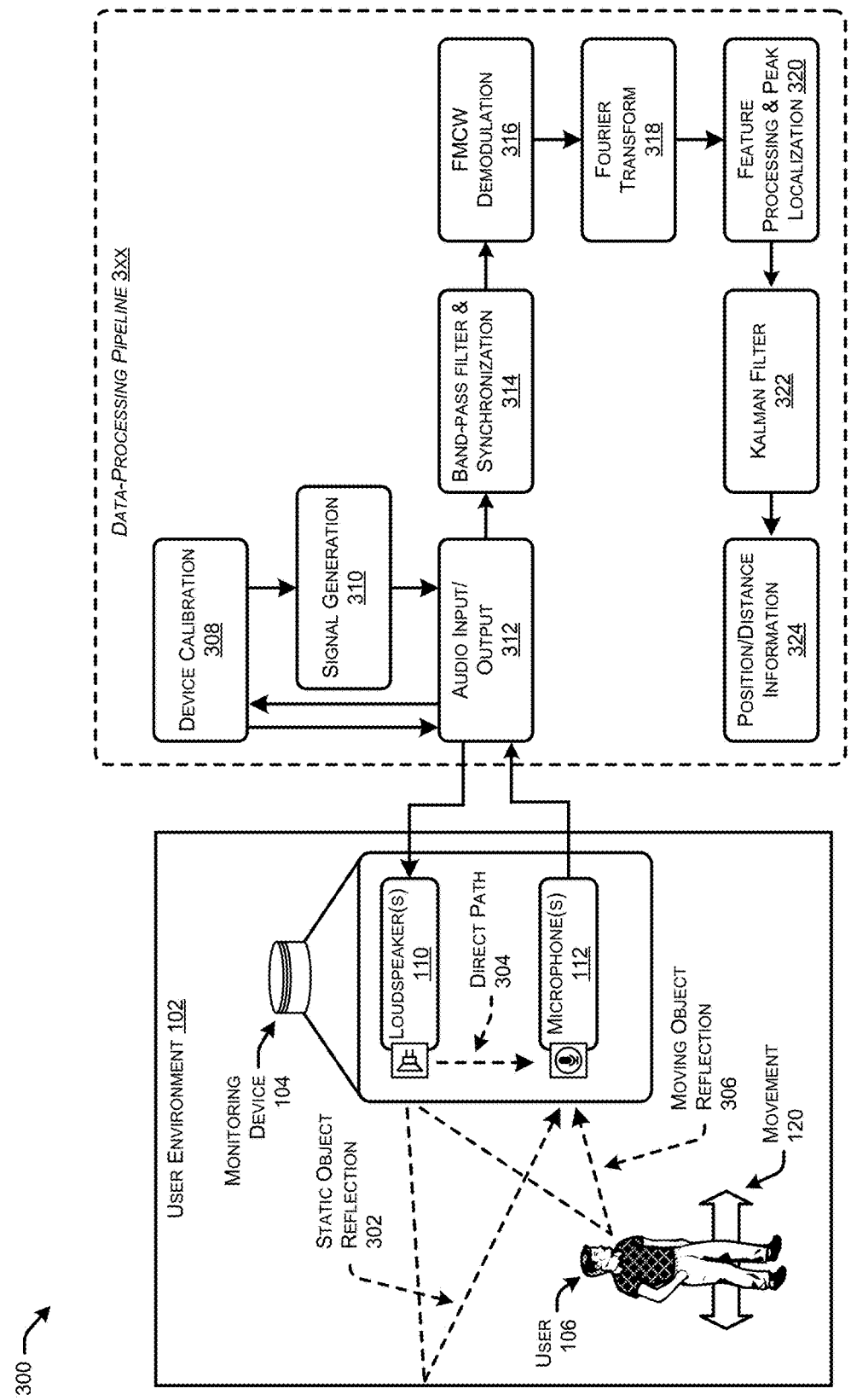
FIG. 3 illustrates an example high-level process for a monitoring device to use ultrasonic signals for performing distance detection indicating a location of a mobile user in an environment over time.

FIG. 3 illustrates an example high-level process 300 for a monitoring device 104 to use ultrasonic signals 114 for performing distance detection indicating a location of a mobile user 106 in an environment 102 over time.

As illustrated, the loudspeaker 110 may emit an ultrasonic signal 114 into the user environment 102, and the microphone(s) 112 may receive various reflection signals corresponding to the emitted ultrasonic signal 114. For instance, the microphone(s) 112 may generate sensor data representing signals such as static object reflections 302 (e.g., reflections off of walls, furniture, ceiling, floor, etc.), direct path 304 signals (e.g., signals that are received by the microphone 112 before leaving the device 104), and moving-object reflections 306 off of a user 106 that is moving 120.

At 308, the calibration component 212 may perform device calibration 308 to determine optimized carrier frequencies, optimized bandwidth sweeps, and/or optimized emission powers for the monitoring device 104 to emit the FMCW ultrasonic signal 114.

At 310, the signal-generation component 210 may generate an FMCW ultrasonic signal to be emitted into the environment 102. At 312, the loudspeaker 110 and microphone 112 may be used to emit the FMCW ultrasonic signals 114, and receive reflections corresponding to the FMCW ultrasonic signals 114. At 314, the processing/filtering component 222 may use band-pass filters and synchronize the signals. For instance, the processing/filtering component 222 may synchronize the channels in order to accurately estimate the time-of-arrival.

At 316, the demodulation component 218 may perform FMCW demodulation, and at 318, the feature-extraction component 220 may perform a Fourier transform (e.g., discrete Fourier transform, fast Fourier transform, etc.) and convert the demodulated signal into the frequency domain. At 320, the clustering component may perform feature processing and peak localization where the peaks in the processed signal are identified. At 322, the movement-detection component 216 may use a Kalman filter 322 to remove outliers in the points, insert missing points, and/or otherwise smooth the trajectory of the movement of the user 106. At 324, the distance component 228 may determine the motion trajectory of the user 106 in the environment by determining the distance the user 106 is from the device 104 over a period of time.

Figure 4:
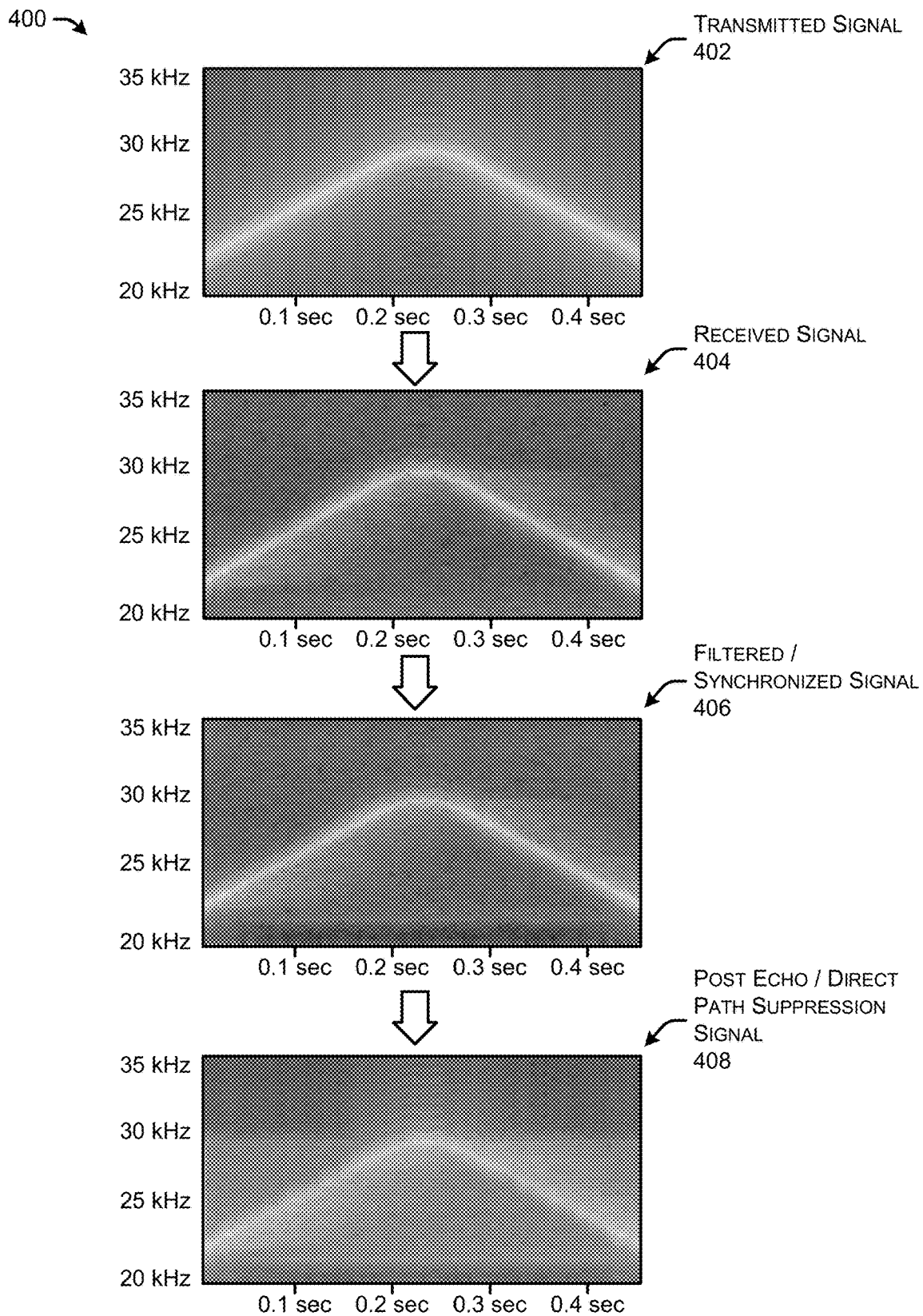
FIG. 4 illustrates different stages of processing a frequency-modulated continuous wave (FMCW) signal.

FIG. 4 illustrates different stages of processing a frequency-modulated continuous wave (FMCW) signal. FIG. 4 illustrates a transmitted signal 402, where the transmitted signal 402 is a FMCW ultrasonic signal with an upchirp and a downchirp. The upchirp and downchirp may generally span the same, or similar, frequencies and may range in any frequency range that is ultrasonic.

FIG. 4 further illustrates a received signal 404 that corresponds to the transmitted signal 402. For instance, the received signal 404 may represent reflections of the transmitted FMCW ultrasonic signal after reflecting off objects in the environment.

Additionally, FIG. 4 illustrates a filtered/synchronized signal 406 which represents the received signal 404 after being synchronized with the transmitted signal 402. FIG. 4 further illustrates a post echo/direct path suppression signal 408 that represents the signal after suppressing echo and direct path signals. For instance, signals representing the direct path and the echo in the room may be used to remove representations of those signals in the received/synchronized signal such that the signal 408 represents the reflections signals that reflected off the moving object.

Figure 5B:
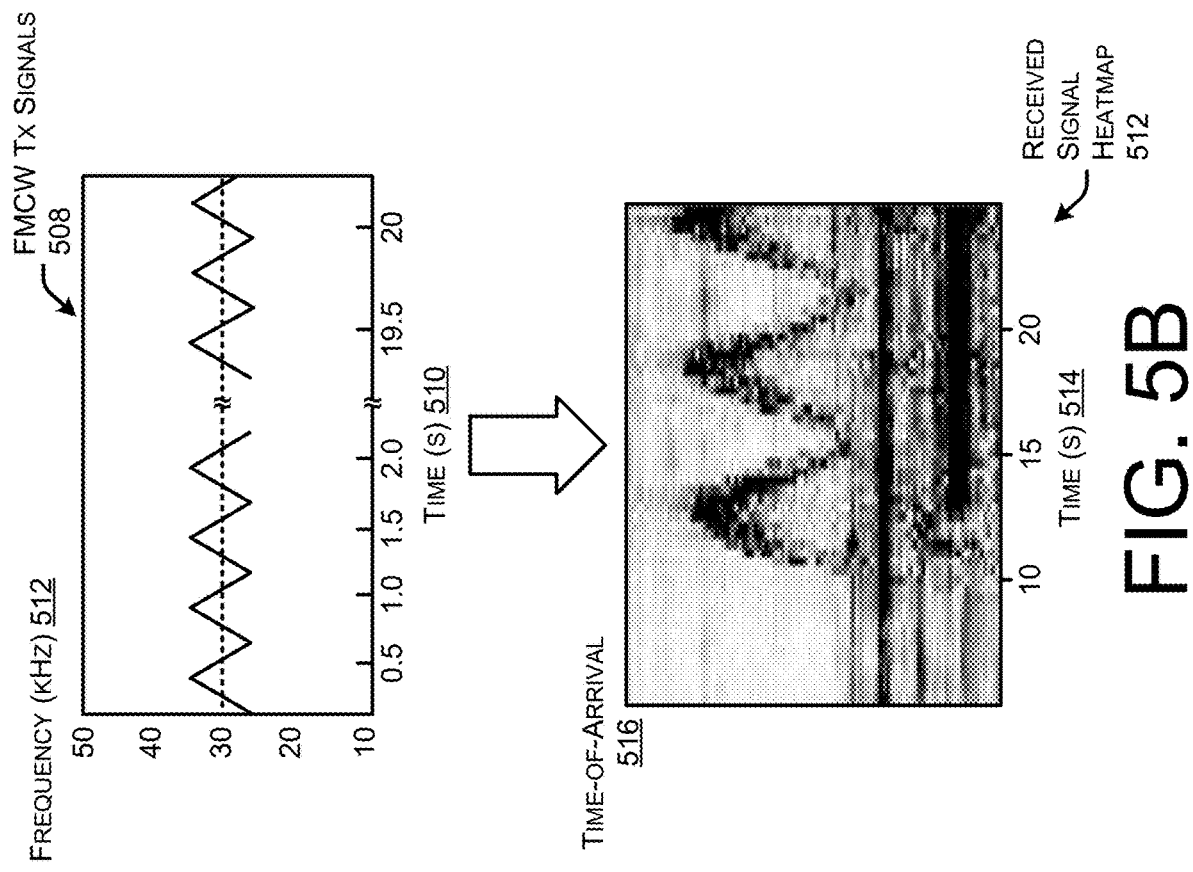
FIG. 5B illustrates example diagrams of FMCW signals that are used to generate a received-signal heatmap indicating a movement path of a user.
Figure 5A:
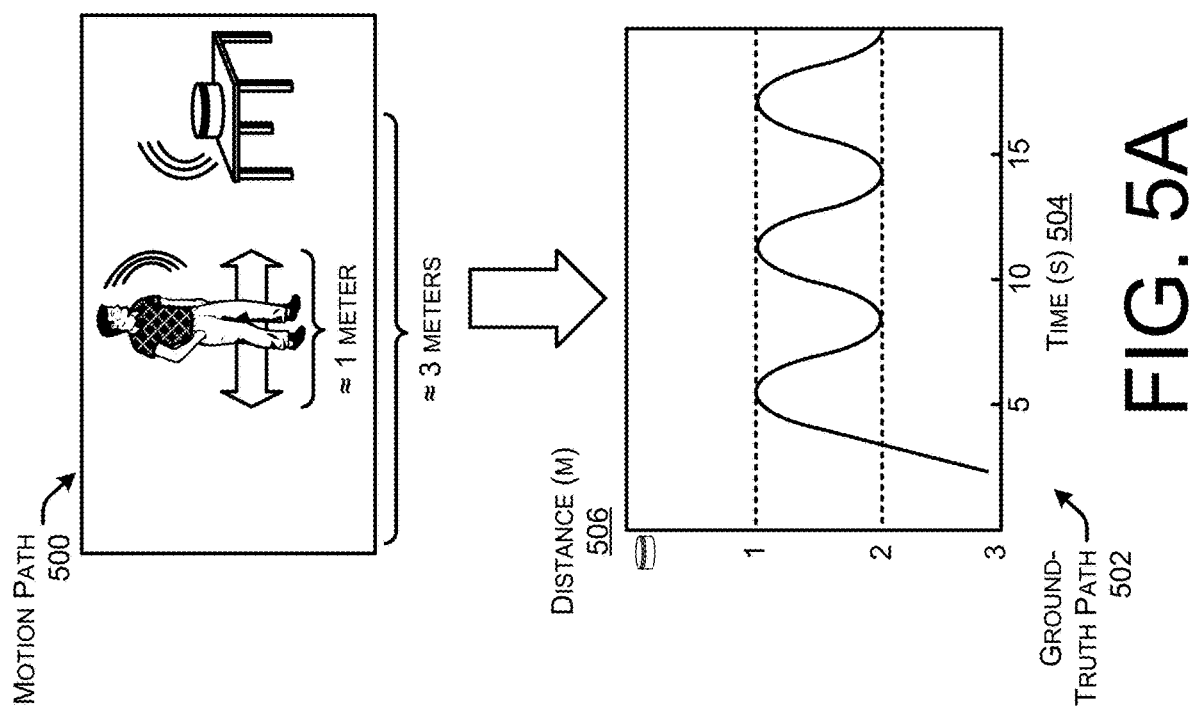
FIG. 5A illustrates example diagrams of a movement path of a user in an environment over a period of time.

FIG. 5A illustrates example diagrams of a movement path of a user in an environment over a period of time. As illustrated, the user 106 moves back and forth over a 1-meter distance. The motion path 500 indicates this movement by the user 106. Further, FIG. 5A illustrates a ground-truth path 502 where the movement of the user is shown over the distance 506 from the device 104 over a period of time 504. As shown, the user 106 is moving towards and away from the monitoring device 104 over a total distance of around 1 meter several times over a period of time.

FIG. 5B illustrates example diagrams of FMCW signals that are used to generate a received-signal heatmap indicating a movement path of a user. FIG. 5A illustrates the FMCW transmit signals 508 as an FMCW signal with an upchirp and a downchirp, in an example frequency range. In the illustrated example, each FMCW ultrasonic signal is around 0.7-0.8 seconds and have an upchirp and a downchirp. The FMCW ultrasonic signals 508 increase in frequency for a range (e.g., 25-35 kHz) and then decrease in frequency for the range (or an upchirp followed by a downchirp).

Further, the received signal heatmap 512 indicates the intensity features for the different time-of-arrivals of the reflection signals after using the constant-reflection signals to remove unwanted representations from the received signals.

Generally, the raw time-of-arrival features can be obtained after the FMCW demodulation of the received chirp "i" using the following equations:

$$K(d, t) = \exp\left(-1j * 2\pi * \frac{dF}{cT}t\right) \quad \text{Equation (1)}$$

$$p_i(d) = \overline{\sum_i \hat{s}_i(t) K(2d, t)} \quad \text{Equation (2)}$$

In the above equations, "c" is the speed of sound, "F" is the bandwidth of the received chirp, "T" is the duration of the chirp, "d" is the distance traveled by the chirp between the monitoring device 104 and the user 106, and "$\hat{s}_i$" is the demodulated signal for the ith chirp. Generally, the p_i(d) approximately corresponds to the intensity of the reflections at distance "d." the absolute value of p_i(d) over time can be noisy, and the reflections off of objects located near (e.g., within 1 meter, within 2 meters, etc.) the emitting loudspeaker 110 may be received at higher intensity/energy values as the reflections off of objects located near the loudspeaker 110 (e.g., within 1 meter) tend to be stronger. To help remove energy values attributable to unwanted reflection signals (e.g., reflections off static objects) from the total energy values from all the received signals, the processing/filtering component 222 may subtract p(d) from a previously obtained p'(d) where p'(d) represents intensity features for reflections where there are no moving objects in the environment, and the reflections are only reflections from static objects in the environment 102.

The received-signal heatmap 512 represents a plot of p_i(d)-p'(d) along time where the intensity at every time-of-arrival 516 is shown versus time 514 (e.g., over the period of time 510), and the constant reflections are subtracted out. In the received-signal heatmap 512, there are several different types of reflections, and among those, the monitoring device 104 may attempt to extract the traces of the user 106 while filtering out other dark areas. To remove the unwanted signals, the characteristics of the unwanted signals are analyzed. For instance, for direct path and nearby reflections, at smaller d, p_i(d) is large due to nearby reflections such as tabletop and internal reflections. They have similar SNR to slightly larger d but at those locations reflections are much weaker, and p_i(d) has a large variance, and |p_i(d)-p(d)| is large. For user motion, which the monitoring device 104 would like to preserve, because of the relatively tall and large surface area of user, the reflection tends to occupy a large chunk of distance ranges, from the nearest reflection (e.g., from the waist) to the farthest reflection (e.g., head and feet). Additionally, when the user 106 moves farther from the loudspeaker 110, the signal becomes weaker, due to longer propagation path.

The received-signal heatmap 512 also represents vibrations at some distances (e.g., corresponding to the ceiling in this example), it can be observed that a larger-than-usual value that are changing rapidly. In some instances, the variance there are sometimes even larger than the nearby reflections which are due to micro-vibrations from some large surfaces (e.g., ceilings and floors). Compared with movement by a user 106, there are at least two differences. First, vibrations tend to occupy a smaller range, since the walls are relatively flat and only those reflections from the area that are perpendicular to the signal propagation direction can be received by the microphone. Second, the large variance is consistent with or without a user moving around (e.g., slow change and shadow on walls). When the user 106 moves around the environment 102, the user 106 will inevitably occlude some part of the background from reflecting the signal. Hence, the intensity at those corresponding distances are slowly changing when the user 106 moves. The slow are relative to the fast vibrations and higher order reflections. In the farther distances we see traces similar to the actual human motion, but much weaker. Those are higher order reflections that involve two or more reflectors along the path. Those are generally farther and weaker than the first order reflections.

FIG. 6A illustrates examples of an unnormalized processed heatmap 600 and a normalized processed heatmap 606 that indicate a movement path of a user 106 in an environment 102. The received-signal heatmap 512 in FIG. 5B may be processed further to generate the unnormalized processed heatmap 600 and the normalized processed heatmap 606.

The raw features can be enhanced by generating the unnormalized processed heatmap 600 and the normalized processed heatmap 606. For instance, the monitoring device 104 may apply time-varied gain to the differential of p_i(d): p_i(d)-p_{i-1}(d) where the differential essentially acts as a high-pass filter to filter out slow changes as well as static background. At the frequency ranges in this case, the attenuation in the amplitude is approximately inverse proportional to the distance. The monitoring device 104 may then apply a median filter with a width of approximately 30 cm (10 samples) on top of the signal for each "i." The median filter can reduce the intensity of the vibrations since they only affect 2-3 samples, but generally does not affect the user 106 motion traces. This feature is represented as the following equation, where d' is the standard deviation for the distances the reflections traveled when there is not movement in the environment 102 (and depicted in the unnormalized processed heatmap 600):

$$p_i^{(abs)}(d) = \text{median}_{d' \in [d-15cm, d+15cm]} d'*(p_i(d')-p_{i-1}(d')) \quad \text{Equation (3)}$$

To generate the normalized-processed heatmap 606, the monitoring device 104 may normalize p_i(d)-p_{i-1}(d) by the standard deviation of p'(d), which is the raw features when there is no movement in the environment 102 (e.g., no user 106 in the environment 102). In this way, the spontaneous vibrations get significantly reduced, but the motion with a low SNR at certain distances (e.g., at those same distances of the vibration) are also reduced. This feature can be represented as the following equation:

$$p_i^{(norm)}(d)=(p_i(d)-p_{i-1}(d)/std(p'(d))$$  Equation (4)

Generally, the monitoring device 104 performs a first pass over the normalized-processed heatmap 606 to determine if there is a large value in the features represented in the normalized-processed heatmap 606 (e.g., intensity values above 15 dB), and determine that those points correspond to either reflections off of the moving object or higher-order reflections. Further, the monitoring device performs a second pass and if the features represented in the unnormalized-processed heatmap 600 at certain distances are large, but less than a threshold in the normalized features, it may be the motion (or may be affected by vibration). Since this is the secondary pass, we already know the points that are selected as indicating reflections off the moving user 106 in the first pass. The monitoring device 104 can then determine the mean absolute value at those distances in the unnormalized-processed heatmap 600, which is a good indicator of how large the unnormalized feature should be where it is the actual user motion. The threshold can be set as a fraction of the mean absolute value.

FIG. 6B illustrates an example movement point-plot including points that correspond to a movement path of a user, and an example peak movement point-plot that indicates points in the movement point-plot that correspond to intensity levels that are above a threshold intensity level.

Using the above-noted analysis, the plots in FIG. 6B can be determined where the movement point-plot 612 may indicate locations that must-be user motion (and higher-order reflections). However, there are multiple points regarding the same reflector for every time frame, and the monitoring device 104 may determine and extract the underlying location points from the plots 612 and 620. To do so, the monitoring device 104 may use a mean shift algorithm to obtain the center of each point clot, and also use a dynamic programming algorithm to group the nearby points into a single location.

The mean-shift algorithm is an algorithm used to converge the maxima of a density function. To find the center of clusters using mean shift, and because a typical user occupies approximately 30 centimeters (cm), which is roughly 10 samples in this case, is used as a window size. The monitoring device 104 may use one-dimensional mean shift algorithm using a flat kernel.

After using the mean-shift algorithm to find the center of the clusters, the monitoring device 104 may group the clusters together using a dynamic programming algorithm to group them into the smallest number of clusters while tolerating a small number of outliers. For example, given a set of 1D points P[1 . . . N] in the integer space, a group of points can span at most K (K~10) (i.e., the difference between the max and min within a group should be at most K). To determine the least number of groups to cover at least a certain portion F of the points (e.g., 90%), the monitoring device 104 may sort P in ascending order. The monitoring device 104 may maintain dp[i,j] that stores the least number of input to be thrown out for P[1 . . . i] if covered by j groups, and prev[i] which stores the smallest point index k such that P[i]−P[j]<=K. For each i and j, the monitoring device 104 calculates the following:

$$prev[i]=argmin_j(P[i]-P[j]<K)$$  Equation (5)

$$dp[i,k]=\min(dp[i-1,k]+1, dp[p[i],k-1])$$  Equation (6)

The monitoring device 104 is performing clustering in 1D, so each time slice is being treated independently. The monitoring device 104 may initially define "K," which is the maximum range of the groups. The monitoring device 104 may then compute the previous vector, which for each index "I" defines how many of the values below it could possibly be in the same group. For instance, if prev[6]=2, that means that the "top" of a group was the point P[6], the bottom would be P[2]. In this example, P[1] must be more than "K" away from P[6]. Next, the monitoring device 104 may build the "dp" matrix and starts at the lower left where there is only 1 point and 1 group, and there are no points left out. The monitoring device 104 puts a "0" at the bottom left where the matrix is storing the number of points that are not in any group. As an example, consider a point dp[i,k], which is clustering the points P[1 . . . i], using j groups. The monitoring device 104 may compute this by at least two paths. In one path, the monitoring device 104 may determine that dp[i,k] includes one more point than dp[i−1,k], so at worst we keep the groups the same and add an ungrouped point. In this example, dp[i,k]=dp[i−1,k]+1. In another path, the monitoring device 104 may determine that dp[i,k] has j groups, and that the device 104 can group all the points from prev[i] to i in one group. Thus, the number of ungrouped points at [i,k] is the same as when we had one fewer group and were grouping up through prev[i]. So in this case dp[i,k]=dp[prev[i], k−1]. Accordingly, the monitoring device 104 may compute each dp[i,k] from the previous ones to reduce the number of ungrouped points. Generally, Equation 5 can be calculated efficient using a binary search. For each cluster, the algorithm outputs the mean of the points inside it.

Now, the monitoring device 104 has determined points for each time frame at 618 with the clustering, and may use a Kalman filter to trace the trajectory of the user 106 over time. However, directly using the points as the traces has a few problems. First, when a user 106 is moving, the velocity introduces Doppler shift. Specifically, when using an upchirp, a velocity towards the loudspeaker 110 would introduce a negative bias when estimating the distance (i.e., looks faster), and when using a downchirp, the bias becomes positive with the same velocity (i.e., looks slower). Second, in each time frame, there may exist multiple points (as shown in the above figure) due to noise and interference such as higher-order reflections, and the monitoring device 104 needs to select one of them that fit the best possible trajectory of a user 106 motion. Conversely, sometimes at certain time frames, there are no point because of low SNR or destructive interference. Hence, an algorithm is needed to correct the bias, smooth out the data, select the best, and fill the void.

The monitoring device 104 achieves this by using Kalman filter such that the time series can be modeled as a prediction-observation combination where the monitoring device 104 can predict the distance at time frame t by using the distance and velocity at time frame t−1, and at each time frame, we have an incoming biased observation to be fused into the prediction and output the result. The straightforward Kalman filter can be constructed with two random variables: the distance at time t, X(t), and the velocity at time t, V(t). Suppose M is the Doppler constant such that at velocity V, the observed distance (O) is biased by MV for upchirp and −MV for downchirp. For each new time step t+1, we have input observation O(t+1). We assume V(t+1)=V(t), and consequently predict the observation:

$$O_{pred}(t+1)=X(t)+V(t)\delta t \pm MV(t+1)$$  Equation (7)

As shown above, δt is the duration between the starting points of two chirps. The monitoring device 104 can then combine O_{pred} with O to product their intersection O_{comb}(t+1). Generally, O_{comb}(t+1) is the intersection of the observation point input into the Kalman filter (or "O"), and the predicted observation that is to follow the current observation point (or "O_{pred}"). Using O_{comm}(t+1), the equations 8 and 9 for X and V can be inferred as being:

$$V(t+1) = O_{comb}(t+1) - X(t))/(\pm M + dt) \quad \text{Equation (8)}$$

$$X(t+1) = (O_{comb}(t+1) * \delta t \pm X(t) * M)/(\pm M + dt) \quad \text{Equation (9)}$$

However, directly applying Kalman Filter on the raw points can result in poor accuracy. To see the reason why, recall that we transmit upchirps and downchirps alternatively. In instances where the frequency band of the chirp is 22 kHz-29.2 kHz, the chirp duration is 0.08 s, and the duration between two chirps is 0.14 s. For downchirps, due to the negative Doppler shifts, the above two equations effectively become:

$$V(t+1) = -(O_{comb}(t+1) - X(t)/0.02 \quad \text{Equation (10)}$$

$$X(t+1) = (O_{comb}(t+1) * 0.14 - X(t) * 0.16)/0.02 \quad \text{Equation (11)}$$

Note the small denominator in the above two equations, which results in V and X would have a large variance, and naturally, a large error. Thus, this large variance illustrates that, because of the Doppler shift, the difference between the current observation, or O_{comb}(which is the actual distance combined with the Doppler bias) and the distance at last time frame, or X (which is just the distance without the Doppler bias) is a small fraction of the actual distance difference. Stated otherwise, the variance caused by the Doppler bias results in the predicted distance calculated in Equation 11 as potentially being dominated by the Doppler bias represented in O_{comb}. Hence, inferring the actual distance essentially requires magnifying the former difference, and also magnifying the error associated with them. To address this problem, the monitoring device 104 adds an extra step before the Kalman filter. The monitoring device 104 removes the bias caused by the Doppler shift by averaging adjacent two observations. Specifically, the new observation is illustrated as follows:

$$O'(t) = \frac{O(t) + O(t-1)}{2} \approx \frac{X(t) + X(t-1)}{2} \quad \text{Equation (12)}$$

The above equation assumes that the velocity at time step t and t−1 are approximately the same. In this way, the bias gets cancelled and the observation is an unbiased estimate of the average distances within two adjacent time frames. The Kalman filter can then be revised as follows:

$$X_{pred}(t) = X(t-1) + V(t-1) * \delta t \quad \text{Equation (13)}$$

$$X_{pred}(t) \sim N(\mu, \theta^2) \quad \text{Equation (14)}$$

$$O'(t) \sim N(\mu', \theta'^2) \quad \text{Equation (15)}$$

$$X_{comb}(t) \sim N\left(\frac{\mu \theta'^2 + \mu' \theta^2}{\theta^2 + \theta'^2}, \frac{\theta^2 \theta'^2}{\theta^2 + \theta'^2}\right) \quad \text{Equation (16)}$$

$$X(t) = X_{comb}(t) \quad \text{Equation (17)}$$

$$V(t) = (X(t) - X(t-1)/\delta t \quad \text{Equation (18)}$$

Using the revised Kalman filter, the monitoring device 104 may generate the peak movement point plot 620 that illustrates the trajectory of the user 106 over time 622. That is, for each FMCW ultrasonic signal, the distances determined for the upchirp and downchirp may be averaged to remove Doppler bias. Generally, the distance for each upchirp and downchirp for an FMCW ultrasonic signal may be included in adjacent time frames. The average distances may then be fed into the Kalman filter which maintains the state of the distance of the moving user over time (e.g., the previous distance, previous velocity, etc.), and use the state to help remove outliers, and smooth the distance trajectory of the movement path of the user over the period of time.

Figure 7A:
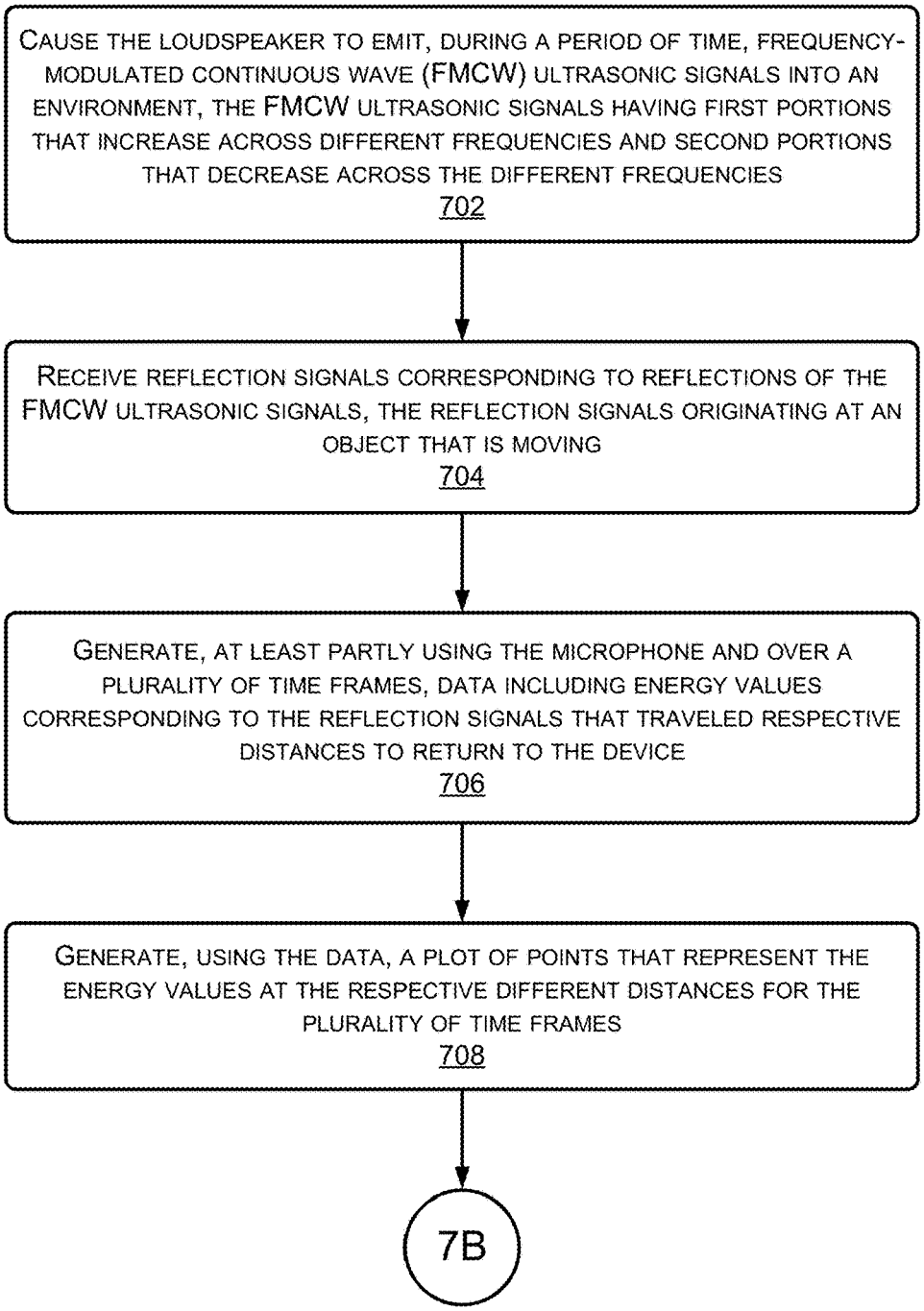
Figure 8:
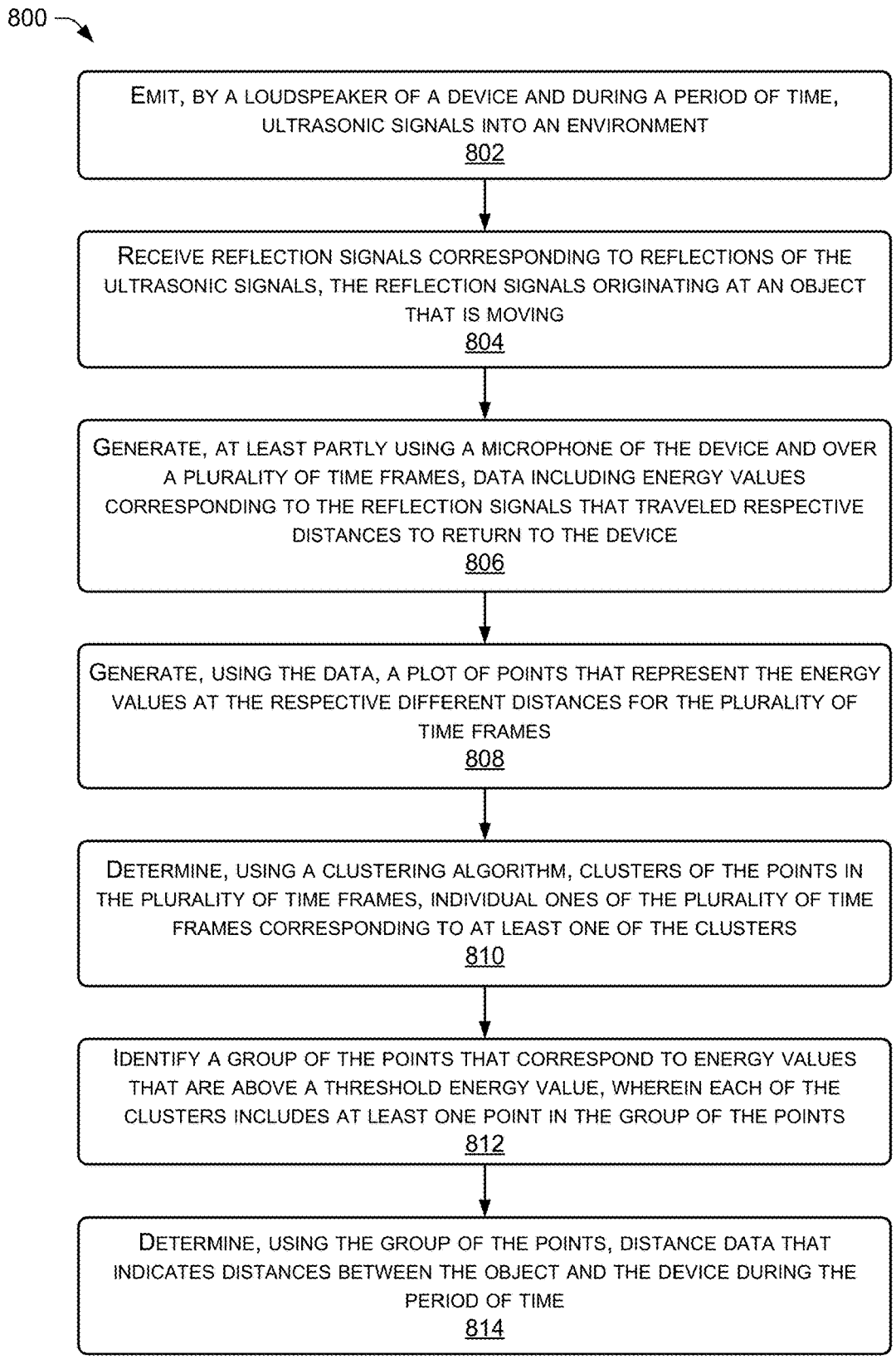
FIG. 8 illustrates another flow diagram of an example process for a monitoring device to emit ultrasonic signals for performing distance detection indicating a location of a user that is moving in an environment over a period of time.

FIGS. 7A, 7B, and 8 illustrate flow diagrams of example processes/methods 700 and 800. These processes (as well as each process or method described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 7 illustrates a flow diagram of an example process 700 for a monitoring device to emit ultrasonic signals for performing distance detection indicating a location of a user that is moving in an environment over a period of time.

At 702, the monitoring device 104 may cause the loudspeaker to emit, during a first period of time, FMCW ultrasonic signals into an environment. For instance, the monitoring device 104 may utilize the loudspeaker 110 to emit multiple FMCW ultrasonic signals into the environment 102, where the FMCW ultrasonic signals have first portions that increase across different frequencies (e.g., upchirps) and second portions that decrease across the different frequencies (e.g. downchirps).

At 704, the monitoring device 104 may receive, using the microphone, reflection signals corresponding to reflections of the FMCW ultrasonic signals. In this example, the reflection signals originate at an object that is moving in the environment 102. In some examples, the reflection signals may be processed such that reflections of the FMCW ultrasonic signals off of static objects are removed (e.g., subtracted) from the reflection signals such that the reflection signals substantially represent reflections off of the moving object (e.g., user 106).

At 706, the monitoring device 104 may generate, at least partly using the microphone and over a plurality of time frames, data including energy values corresponding to the reflection signals that traveled respective distances to return to the device. The monitoring device 104 may demodulate the signal and perform a Fourier transform to determine the energy values (e.g., intensity values).

At 708, the monitoring device 104 may generate, using the data, a plot of points that represent the energy values at the respective different distances for the plurality of time frames. The plot may be a heatmap (or a probability map) that represents the intensity values, or energy values, and different distances (e.g., different time-of-arrivals) for the plurality of time frames.

At 710, the monitoring device 104 may identify, from the points and in a first time frame, a first point that corresponds to a first reflection of a first portion of a first FMCW ultrasonic signal, the first point being associated with a first distance. For instance, the monitoring device 104 may identify a point above a threshold energy value, or the point with the highest energy value, for a time frame that represents a reflection of an upchirp in the first FMCW ultrasonic signal.

At 712, the monitoring device 104 may identify, from the points and in a second time frame adjacent the first time frame, a second point that corresponds to a second reflection of a second portion of the first FMCW ultrasonic signal, the second point being associated with a second distance. For instance, the monitoring device 104 may identify a point above the threshold energy value, or the point with the highest energy value, for the second time frame that represents a reflection of a downchirp in the first FMCW ultrasonic signal.

At 714, the monitoring device 104 may calculate an average distance using the first distance and the second distance. Thus, the distance of a point representing an upchirp and the distance of a point representing a downchirp in an adjacent time frame may be used to determine an average distance. In this way, the average distance represents the location/distance of the user 106 and removes bias from the Doppler effect. At 716, the monitoring device 104 may determine, based at least in part on the average distance, distance data indicating a distance between the object and the monitoring device. For instance, the average distance may be used to determine a movement trajectory, or as a point in the movement trajectory.

FIG. 8 illustrates another flow diagram of an example process 800 for a monitoring device to emit ultrasonic signals for performing distance detection indicating a location of a user that is moving in an environment over a period of time.

At 802, the monitoring device 104 may emit, by a loudspeaker of a device and during a period of time, ultrasonic signals into an environment. For instance, the monitoring device 104 may use the loudspeaker 110 to emit an FMCW ultrasonic signal into the environment 102.

At 804, the monitoring device 104 may receive reflection signals corresponding to reflections of the ultrasonic signals, the reflection signals originating at an object that is moving. For instance, the monitoring device 104 may receive reflected ultrasonic signals 122 the reflect off all objects in the environment 102, and process the received signals using reflections off static objects to isolate and identify reflections off a moving object (e.g., the user 106).

At 806, the monitoring device 104 may generate, at least partly using a microphone of the device and over a plurality of time frames, data including energy values corresponding to the reflection signals that traveled respective distances to return to the device. For instance, the monitoring device 104 may use the microphone 112 to generate data including energy values (e.g., feature data determined after demodulating and converting to the frequency domain) representing the reflection signals for different time-of-arrivals over a period of time during which the ultrasonic signals were emitted.

At 808, the monitoring device 104 may generate, using the data, a plot of points that represent the energy values at the respective different distances for the plurality of time frames. The plot may be a heatmap (or a probability map) that represents the intensity values, or energy values, and different distances (e.g., different time-of-arrivals) for the plurality of time frames.

At 810, the monitoring device 104 may determine, using a clustering algorithm (e.g., means shift, K-means, etc.), clusters of the points in the plurality of time frames, where individual ones of the plurality of time frames corresponding to at least one of the clusters.

At 812, the monitoring device 104 may identify a group of the points that correspond to energy values that are above a threshold energy value, wherein each of the clusters includes at least one point in the group of the points. That is, the monitoring device 104 may determine points that have energy values above a threshold that is indicative of a user 106 moving in the environment 102 (e.g., must-be movement points).

At 814, the monitoring device 104 may determine, using the group of the points, distance data that indicates distances between the object and the device during the period of time. For instance, the monitoring device 104 may calculate distances based on time-of-arrivals (e.g., using the travel time and speed of sound) using the group of points where the points represent the user moving, or the user trajectory, over the period of time.

As used herein, a processor, such as processor(s) 202 may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 202 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 202 may possess its own local memory, which also may store program components, program data, and/or one or more operating systems.

As described herein, computer-readable media and/or memory 204 may include volatile and nonvolatile memory, removable and non-removable media implemented in any method or technology for storage of information, such as computer-readable instructions, data structures, program component, or other data. Such computer-readable media and/or memory 204 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 202 to execute instructions stored on the computer-readable media and/or memory 204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 202.

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media and/or memory 204, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 248 may enable communications between the monitoring device 104 and other networked devices. Such network interface(s) 248 can include one or more network interface controllers (NICs) or other types of transceiver devices to send and receive communications over a network.

For instance, the network interface(s) 248 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 248 may include a wide area network (WAN) component to enable communication over a wide area network. The networks that the monitoring device 104 may communicate over may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A monitoring device comprising:
a loudspeaker;
one or more processors; and
one or more computer-readable media storing computer-executable instructions that, when executed by the one or more processors, cause the one or more processors to perform operations comprising:
causing the loudspeaker to emit, during a period of time, frequency-modulated continuous wave (FMCW) ultrasonic signals into an environment, a first FMCW ultrasonic signal having a first portion that increases in frequency in a frequency range and a second portion that decreases in frequency in the frequency range;
receiving reflection signals corresponding to the FMCW ultrasonic signals, the reflection signals originating at an object in motion;
generating, over a plurality of time frames, data including energy values corresponding to the reflection signals;
identifying, for a first time frame, a first energy value that corresponds to a first reflection of the first portion of the first FMCW ultrasonic signal, the first energy value being associated with a first distance;
identifying, for a second time frame adjacent the first time frame, a second energy value that corresponds to a second reflection of the second portion of the first FMCW ultrasonic signal, the second energy value being associated with a second distance;
calculating an average distance using the first distance and the second distance; and
determining, based at least in part on the average distance, distance data indicating a distance between the object and the monitoring device.

2. The monitoring device of claim 1, the average distance being a first average distance, the operations further comprising:
identifying, for a third time frame, a third energy value that corresponds to a third reflection of a first portion of a second FMCW ultrasonic signal, the third energy value being associated with a third distance;
identifying, for a fourth time frame adjacent the third time frame, a fourth energy value that corresponds to a fourth reflection of a second portion of the second FMCW ultrasonic signal, the fourth energy value being associated with a fourth distance;
calculating a second average distance using the third distance and the fourth distance; and
determining, using the first average distance and the second average distance, multiple distances between the object and the monitoring device during the period of time.

3. The monitoring device of claim 1, the operations further comprising:
determining clusters of the energy values in the plurality of time frames, individual ones of the plurality of time frames corresponding to at least one of the clusters;
identifying a group of the energy values that are above a threshold energy value, wherein each of the clusters includes at least one of the energy values in the group of the energy values; and
determining, using the group of the energy values, distance-trajectory data that indicates distances between the object and the monitoring device during the period of time.

4. The monitoring device of claim 1, the operations further comprising:
   generating, using the data, a plot of points that represent the energy values at the respective different distances for the plurality of time frames;
   calculating, from the points, a plurality of average distances for the plurality of time frames, each of the plurality of average distances being calculated using at least one point corresponding to a reflection of a first portion of the FMCW ultrasonic signals and at least one point corresponding to a reflection of a second portion of the FMCW ultrasonic signals; and
   analyzing, using a Kalman filter, the plurality of average distances in a successive sequence based at least in part on which of the plurality of time frames individual ones of the average distances correspond; and
   determining, based at least in part on the analyzing, distance-trajectory data that indicates distances between the object and the monitoring device during the period of time.

5. The monitoring device of claim 1, wherein the ultrasonic signals are emitted at least partly using transmitted signal data, the operations further comprising:
   generating received signal data representing the reflection signals; and
   demodulating the received signal data using the transmitted signal data to generate demodulated signal data; and
   identifying, from the demodulated signal data, frequency components that correspond to the energy values associated with the respective distances.

6. The monitoring device of claim 1, wherein the ultrasonic signals are first ultrasonic signals and the period of time is a first period of time, the operations further comprising:
   emitting, by the loudspeaker, second ultrasonic signals into the environment during a second period of time;
   receiving second reflection signals corresponding to the second ultrasonic signals, the second reflection signals originating at a fixed object in the environment;
   generating second data representing second energy values corresponding to the second reflection signals; and
   removing, using the second data, a portion of the data that corresponds to the second energy values.

7. A method comprising:
   emitting, by a loudspeaker of a device and during a period of time, ultrasonic signals into an environment;
   receiving reflected signals corresponding to the ultrasonic signals, the reflected signals originating at an object in motion;
   generating, over a plurality of time frames, data including energy values corresponding to the reflected signals, wherein the reflected signals traveled respective distances to return to the device;
   generating, using the data, a plot that represents the energy values at the respective different distances for the plurality of time frames;
   determining, for each of the plurality of time frames, a cluster of the energy values;
   identifying a group of the energy values that are above a threshold energy value, wherein each of the clusters includes at least one energy value in the group of the energy values; and
   determining, using the group of the energy values, distance data that indicates distances between the object and the device during the period of time.

8. The method of claim 7, wherein the ultrasonic signals include a frequency-modulated continuous wave (FMCW) ultrasonic signal having a first portion that increases in frequency in a frequency range and a second portion that decreases in frequency in the frequency range, further comprising:
   identifying, from the group of the energy values and in a first time frame, a first energy value that corresponds to the first portion, the first energy value being associated with a first distance;
   identifying, from the group of the energy values and in a second time frame adjacent the first time frame, a second energy value that corresponds to the second portion, the second point being associated with a second distance; and
   calculating an average distance using the first distance and the second distance,
   wherein determining the distance data is based at least in part on the average distance.

9. The method of claim 7, wherein the ultrasonic signals are frequency-modulated continuous wave (FMCW) ultrasonic signals that each have a first portion that increase in frequency in a frequency range and a second portion that decreases in frequency in the frequency range, further comprising:
   calculating, from the group of the energy values, a plurality of average distances for the plurality of time frames, the plurality of average distances each being calculated using a point corresponding to a reflection of a first portion of the FMCW ultrasonic signals and another point corresponding to a reflection of a second portion of the FMCW ultrasonic signals; and
   determining, based at least in part on the plurality of average distances, distance-trajectory data that indicates distances between the object and the device during the period of time.

10. The method of claim 7, wherein the ultrasonic signals are emitted at least partly using transmitted signal data, further comprising:
   generating received signal data representing the reflection signals;
   demodulating the received signal data using the transmitted signal data to result in demodulated signal data; and
   identifying, from the demodulated signal data, frequency components that correspond to the energy values at the respective distances.

11. The method of claim 7, wherein the ultrasonic signals are first ultrasonic signals and the period of time is a first period of time, further comprising:
   emitting, by the loudspeaker, second ultrasonic signals into the environment during a second period of time;
   receiving second reflection signals corresponding to the second ultrasonic signals, the second reflection signals originating at a fixed object in the environment;
   generating second data representing second energy values corresponding to the second reflection signals; and
   removing, using the second data, a portion of the data that corresponds to the second energy values.

12. The method of claim 11, wherein the energy values are first energy values, further comprising:
   determining a deviation value indicating a standard deviation associated with the second energy values; and
   dividing the first energy values by the deviation value such that a portion of the first energy values corresponding to vibrations from the environment are reduced.

13. A computing device comprising:
a loudspeaker;
one or more processors; and
one or more computer-readable media storing computer-executable instructions that, when executed by the one or more processors, cause the one or more processors to perform operations comprising:
causing the loudspeaker to emit, during a period of time, frequency-modulated continuous wave (FMCW) ultrasonic signals into an environment, a first FMCW ultrasonic signal having a first portion that increases in frequency in a frequency range and a second portion that decreases in frequency in the frequency range;
receiving reflection signals corresponding to reflections of the FMCW ultrasonic signals, the reflection signals originating at an object in motion;
generating, over a plurality of time frames, data including energy values corresponding to the reflection signals, wherein the reflection signals traveled respective distances to return to the computing device;
identifying, for a first time frame, a first energy value that corresponds to a first reflection of the first portion of the first FMCW ultrasonic signal, the first energy value being associated with a first distance;
identifying, for a second time frame adjacent the first time frame, a second energy value that corresponds to a second reflection of the second portion of the first FMCW ultrasonic signal, the second energy value being associated with a second distance;
calculating an average distance using the first distance and the second distance; and
determining, based at least in part on the average distance, distance data indicating a distance between the object and the computing device.

14. The computing device of claim 13, the average distance being a first average distance, the operations further comprising:
identifying, for a third time frame, a third energy value that corresponds to a third reflection of a first portion of a second FMCW ultrasonic signal, the third energy value being associated with a third distance;
identifying, for a fourth time frame adjacent the third time frame, a fourth energy value that corresponds to a fourth reflection of a second portion of the second FMCW ultrasonic signal, the fourth energy value being associated with a fourth distance;
calculating a second average distance using the third distance and the fourth distance;
determining, using the first average distance and the second average distance, multiple distances between the object and the computing device during the period of time.

15. The computing device of claim 13, the operations further comprising:
generating, using the data, a plot of points that represent the energy values at the respective different distances for the plurality of time frames;
determining clusters of the points in the plurality of time frames, individual ones of the plurality of time frames corresponding to at least one of the clusters;
identifying a group of the points that correspond to energy values that are above a threshold energy value, wherein each of the clusters includes at least one of the points in the group of the points; and
determining, using the group of the points, distance-trajectory data that indicates distances between the object and the computing device during the period of time.

16. The computing device of claim 13, the operations further comprising:
generating, using the data, a plot of points that represent the energy values at the respective different distances for the plurality of time frames;
calculating, from the points, a plurality of average distances for the plurality of time frames, each of the plurality of average distances being calculated using at least one point corresponding to a reflection of a first portion of the FMCW ultrasonic signals and at least one point corresponding to a reflection of a second portion of the FMCW ultrasonic signals; and
analyzing, using a Kalman filter, the plurality of average distances in a successive sequence based at least in part on which of the plurality of time frames individual ones of the average distances correspond; and
determining, based at least in part on the analyzing, distance-trajectory data that indicates distances between the object and the computing device during the period of time.

17. The computing device of claim 13, wherein the ultrasonic signals are emitted at least partly using transmitted signal data, the operations further comprising:
generating received signal data representing the reflection signals; and
demodulating the received signal data using the transmitted signal data to generate demodulated signal data; and
identifying, from the demodulated signal data, frequency components that correspond to the energy values associated with the respective distances.

18. The computing device of claim 13, wherein the ultrasonic signals are first ultrasonic signals and the period of time is a first period of time, the operations further comprising:
emitting, by the loudspeaker, second ultrasonic signals into the environment during a second period of time;
receiving second reflection signals corresponding to the second ultrasonic signals, the second reflection signals originating at a fixed object in the environment;
generating second data representing second energy values corresponding to the second reflection signals; and
removing, from the second data, a portion of the data that corresponds to the second energy values.

19. The computing device of claim 18, wherein the energy values are first energy values, the operations further comprising:
determining a deviation value indicating a standard deviation associated with the second energy values; and
dividing the first energy values by the deviation value such that a portion of the first energy values corresponding to vibrations from the environment are reduced.

20. The computing device of claim 13, wherein the ultrasonic signals are first ultrasonic signals and the period of time is a first period of time, the operations further comprising:
emitting, by the loudspeaker, second ultrasonic signals into the environment during a second period of time;
receiving second reflection signals corresponding to the second ultrasonic signals, the second reflection signals originating at a fixed object in the environment;
generating second data representing second energy values corresponding to the second reflection signals; and removing, using the second data, a portion of the data that corresponds to the second energy values.

\* \* \* \* \*